United States Patent [19]

Gastouniotis et al.

[11] Patent Number: 5,438,329
[45] Date of Patent: Aug. 1, 1995

[54] DUPLEX BI-DIRECTIONAL MULTI-MODE REMOTE INSTRUMENT READING AND TELEMETRY SYSTEM

[75] Inventors: C. S. Gastouniotis, Santa Barbara; Nuno Bandeira, Goleta, both of Calif.; Bruce E. Gray, Murrysville; Scott H. Seehoffer, Uniontown, both of Pa.

[73] Assignee: M & FC Holding Company, Inc., Wilmington, Del.

[21] Appl. No.: 72,241

[22] Filed: Jun. 4, 1993

[51] Int. Cl.⁶ ............................................. G08C 17/02
[52] U.S. Cl. ..................... 340/870.02; 240/870.03; 240/870.11; 240/825.54; 455/54.1; 455/67.1; 455/88
[58] Field of Search .................. 340/870.02, 870.03, 340/870.11, 870.06, 825.54, 505; 455/2, 31.1, 32.1, 54.1, 57.1, 67.1, 67.7, 88

[56] References Cited

U.S. PATENT DOCUMENTS

| | | | |
|---|---|---|---|
| 3,639,907 | 2/1972 | Greatbatch | 340/505 |
| 3,754,250 | 8/1973 | Bruner | 340/870.03 |
| 3,976,202 | 6/1976 | Batz | 325/31 |
| 4,031,513 | 6/1977 | Simciak | 340/152 T |
| 4,455,453 | 6/1984 | Parasekvakos et al. | 340/825.26 |
| 4,614,945 | 9/1986 | Brunius et al. | 340/870.03 |
| 4,749,992 | 6/1988 | Fitzemeyer et al. | 340/870.02 |
| 4,799,059 | 1/1989 | Grindahl et al. | 340/870.03 |
| 4,839,642 | 6/1989 | Batz et al. | 340/825.54 |
| 5,194,860 | 3/1993 | Jones et al. | 340/870.02 |

Primary Examiner—Brent Swarthout
Assistant Examiner—Daniel J. Wu
Attorney, Agent, or Firm—Lorusso & Loud

[57] ABSTRACT

The remote instrument reading and telemetry system of the present invention includes at least one instrument link interconnected to a data gathering device and a remote station interrogation apparatus. The interrogation apparatus and instrument link both include radio transmitters and receivers so information and instructions can be communicated between them. In the interrogation mode, the interrogation apparatus instructs the instrument link to transmit information (e.g., data from the data gathering device) in a specified manner, within certain time frames, and in a specific frequency channel. Before requesting the transmission of information, the interrogation apparatus determines which of the available reply radio channels is the best for transmission of information and instructs the instrument link to use this reply channel. In a preferred embodiment, the instrument link transmits information using spread spectrum modulation techniques, and the interrogation apparatus determines the spread spectrum parameters that optimize processing gain and the data transmission rate. The instrument link is also controlled so that parts of the instrument link (e.g., the transmitter's amplifier) are only powered up during specific periods of instrument link activity to conserve power.

22 Claims, 13 Drawing Sheets

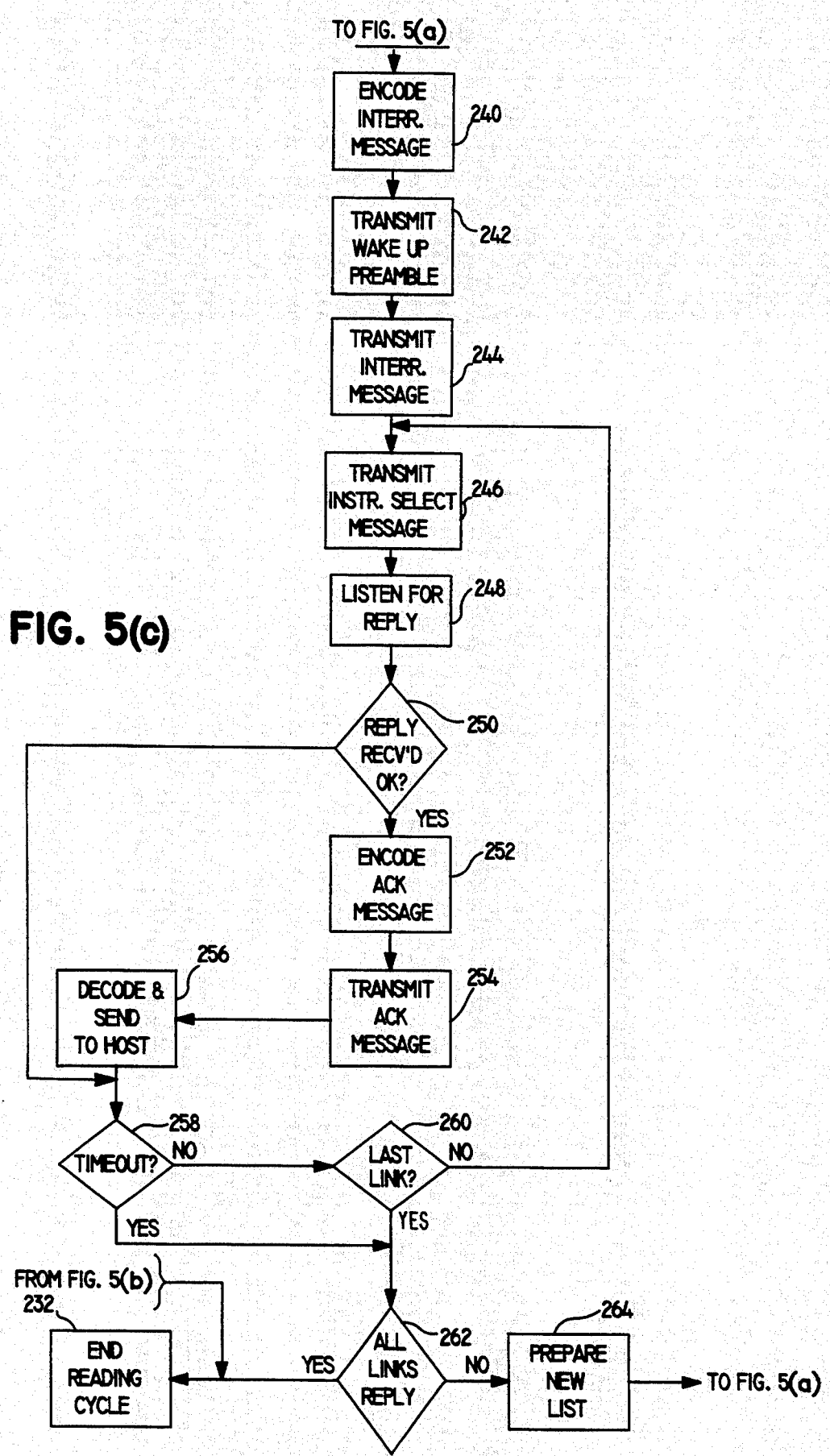

DUPLEX BI-DIRECTIONAL MULTI-MODE REMOTE INSTRUMENT READING AND TELEMETRY SYSTEM

FIELD OF INVENTION

This invention relates generally to remote instrument monitoring and specifically to a system for automatically transmitting information by radio frequency (RF) signals from a plurality of remote instrument reading units to a stationary or mobile data collection center. A particular application of such a system is for the remote reading of water, gas and electric utility meters.

BACKGROUND OF THE INVENTION

The need for automatically communicating from a plurality of instrumentation devices located at fairly remote and inaccessible locations to a central collection center has been acutely present for many years. Techniques have been implemented that utilize the telephone or power lines of the subscriber or commodity user (i.e., the utility customer). The installation of such systems requires a hard wire connection be established between the instrument link and the user's phone or power lines. Such a connection can increase installation costs for example, due to trenching and the actions to restore the affected landscape and/or structures to their original condition.

Another solution for automated instrumentation reading employs an radio frequency (RF) communication link between the instrument links, the instrument reading unit, and a remote station for data collection. Typically the remote station transmits interrogation signals or messages to the instrument links, and the instrument links in response transmit an RF reply signal containing the requested information and an instrument link identifier. Examples of such RF communication link systems are disclosed in U.S. Pat. Nos. 4,031,513; 4,614,945; and 4,799,059.

The disclosed systems are subject to a number of constraints. Because of the reduced power levels for unlicensed operation, the instrument links have operating ranges for transmitting RF signals of about 1000 feet. This limitation in operating range results because FCC regulations limit the power output of unlicensed transmitters to a maximum field strength of 50 millivolts at 3 meters which corresponds to a transmitter power output of less than 1 milliwatt.

These systems are susceptible to RF interference because of the narrow band modulation schemes implemented. To counter this the disclosed systems typically transmit the same message repeatedly at shifted frequencies presuming that at least one of the transmitted messages would get through and be properly received. While such operation may be workable up to now, the FCC has recently allocated some of the bands being used to unlicensed spread spectrum operation. Spread spectrum operation in these bands can increase the noise level to the point that acceptable operation of such systems will be difficult or impossible.

The remote station are bulky and in general require that the remote station be mounted in a vehicle which transits the area with instrument links to be interrogated.

One system operates in a common wakeup mode, where an interrogation signal is sent to all instrument links within range of the remote station's transmitter. The problems with signal collision (i.e., simultaneous receipt of two instrument link reply signals) prevents reliable use in areas densely populated with instruments thereby restricting operation to rural and medium density instrument link environments. This problem increases if the transmission range of the instrument link is increased.

Therefore, it is an object of the present invention to provide a multi-mode remote instrument reading and telemetry system that offers high immunity to RF interference yet does not require FCC licensing of the instrument link transmitter.

It is another object of the present invention to provide a meter reading and telemetry system that can dynamically adjust processing gain to reflect environmental conditions and to achieve an optimal balance between data retrieval speed and collision resistance.

It is a further object of the present invention to provide a meter reading unit where the transmission range is significantly increased over that of known prior art systems.

It is yet another object of the present invention to provide a meter reading unit which uses power conservation techniques to extend the life of the power supply.

SUMMARY OF THE INVENTION

This invention features a data collection system, comprising an interrogation apparatus and at least one instrument link, interconnected to a data gathering device located remote from said interrogation apparatus. This invention also features an apparatus for interrogating remotely located instrument links and the instrument link used with this interrogattion apparatus.

The interrogation apparatus further includes an interrogation transmitter means, an interrogation receiver means, frequency determining means, interrogation signal determining means, tuning means and informational message signal processing means.

The interrogation transmitter means transmits a radio frequency (RF) signal at a predetermined frequency to the remotely located instrument link, where each instrument link has a unique, prespecified identification number. The interrogation receiver receives the informational message being transmitted from the instrument link and it is tunable to any of a number of center frequencies which lie in a prespecified bandpass.

The frequency determining means, using the interrogation receiver means, determines what center frequency, in the prespecified bandpass, the informational signals from said instrument link should be transmitted on. The interrogation signal determining means is responsive to the frequency determining means. The signal determining means determines the content of an interrogation message that is to be transmitted by the interrogation transmitter means. The interrogation message provides at least the center frequency for transmitting the informational message.

A tuning means is provided for tuning the interrogation receiver means to the center frequency determined by the frequency determining means. In this way the interrogation apparatus can receive the informational messages being sent by the instrument link. The informational message signal processing means both processing the informational message received by the interrogation receiver and provides an output representative of the information transmitted by the instrument link.

Each instrument link includes an instrument link receiver, an interrogation signal processing means, instrument link transmission means, and informational message generating means. The instrument link receiver is tuned to the predetermined frequency of the interrogation transmitter. The receiver provides an output representative of a transmitted interrogation message and the message preamble. The interrogation signal processing means processes the receiver's output to determine at least what information is to be transmitted by each said instrument link and at what center frequency to transmit an informational message.

The instrument link transmission means transmits the informational message at the center frequency determined by the interrogation signal processing means. This can be accomplished because the instrument link transmission means is tunable to any of the predetermined center frequencies in the prespecified bandpass for reply messages from the instrument links. The informational message generating means generates an informational message for transmission by the instrument link transmission means. The message generated provides the information requested in the interrogation message as well as information identifying the transmitting instrument link.

In one embodiment, the system is configured to use spread spectrum modulation techniques to communicate the informational message from the instrument link to the interrogation apparatus. As such, the instrument link transmission means includes a spread spectrum signal transmission means for transmitting spread spectrum radio frequency (RF) signals and the interrogation receiver means includes spread spectrum receiving means for receiving and processing the spread spectrum RF signals being transmitted by the instrument link's spread spectrum signal transmission means. The interrogation signal being transmitted from the interrogation transmitter means further includes the pseudorandom code sequence used to modulate the spread spectrum base-band signal being transmitted from the instrument link.

The interrogation apparatus further includes an adjusting and selecting means, responsive to the interrogation receiver, that dynamically adjusts the pseudorandom code sequence from a default code sequence (e.g., 64 chips) to another predetermined code sequence to increase processing gain and also selects the pseudorandom code sequence so that system operation is not interfered with by spread spectrum signals from outside or extraneous signal sources. Thus, the pseudorandom code sequence transmitted in the interrogation signal is the code sequence determined by the adjusting and selecting means. The instrument link's spread spectrum transmission means is adjustable to transmit a spread spectrum signal using any one of a number of available predetermined pseudorandom sequences (e.g., 64, 128, 256, 512 and 1024 chips).

BRIEF DESCRIPTION OF THE DRAWINGS

FIGS. 5a-c is a flow diagram of the remote station's operations/functions in the interrogation mode.

DESCRIPTION OF THE PREFERRED EMBODIMENT

Figure 1:
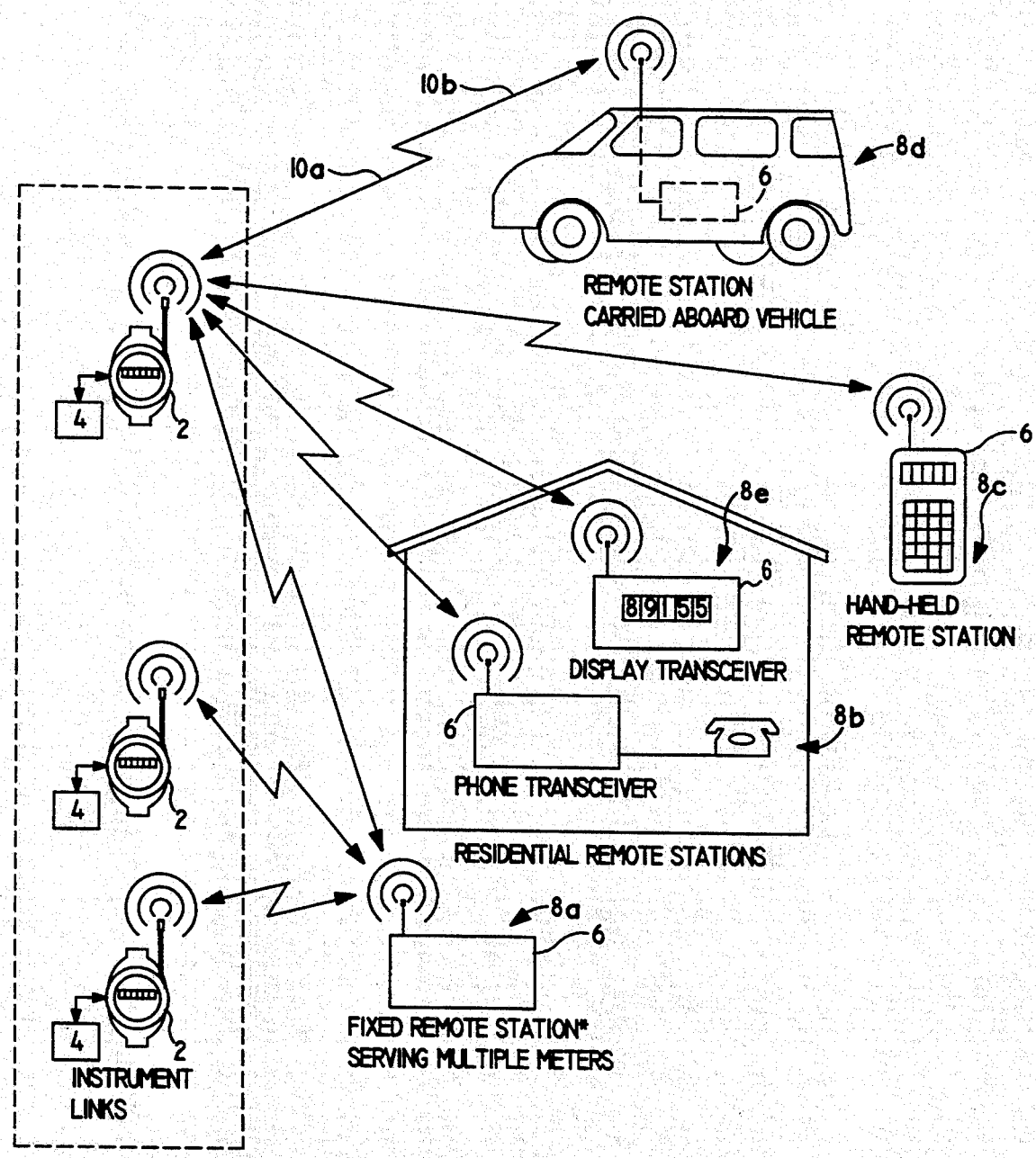
FIG. 1 is a block diagram of the duplex bi-directional multi-mode remote instrument reading and telemetry system.

A duplex bi-directional multi-mode remote instrument reading and telemetry system of the present invention can have different possible configurations as shown in FIG. 1. The system includes a plurality of remotely located instrument reading units or instrument links 2, each associated with an data gathering device 4 or instrument such as a utility meter. Each instrument link includes a self powered receiver 44 and transmitter means 30 (see FIG. 2).

The system also includes at least one remote station 6 that interrogates the instrument links 2 and separately receives the transmitted output from each data link. Each remote station 6 includes an interrogation transmitter and receiver (see FIG. 3). There are a number of possible different configurations for the remote station 6 as illustrated in FIG. 1. The remote station may be a fixed installation 8a (i.e., stationary), a residential installation 8b, a hand held unit 8c, or a mobile installation 8d (i.e., carried aboard a vehicle). For a residential installation 8b, the remote station 6 is connected to a phone line via a modem to communicate data gathered to a remote data collection center (not shown). In addition, or alternatively, a residential use could involve configuring a remote station 6 so that it provides a residential display 8e, dedicated to the homeowner's utility meters.

It should be recognized that while one remote station configuration is illustrated (e.g., one fixed installation), the number of remote stations used to interrogate and receive information from remotely located instrument links is dictated by the specific application. For multiple fixed remote station installations, the remote stations can be configured to communicate with each other as well as with the instrument links. In this way, data obtained by one remote station can be communicated to a central location using the other remote stations as a relay. Also, while the following description of the remote station 6 and associated instrument links 2 imply a serial mode, the transmit and receive functions of both the remote station and instrument links may operate simultaneously to allow full duplex operation.

As illustrated in FIG. 1, an RF signal 10a is sent out by a remote station 6 to each instrument link 2 to obtain information acquired by the data gathering unit 4 (e.g., a utility meter) since the last reading. The initial RF signal transmitted, wakes up and interrogates the instrument links. In response to this RF signal 10a, each instrument link interrogated transmits a RF signal 10b (i.e., a reply message) back to the remote station 6. If the reply message is properly received, the remote station transmits another RF signal 10a, an acknowledgment message, that acknowledges proper receipt of a specific instrument link reply message. The system may also operate in a one way-mode wherein an instrument link 2 automatically transmits data at a fixed intervals to the remote station 6.

Figure 2:
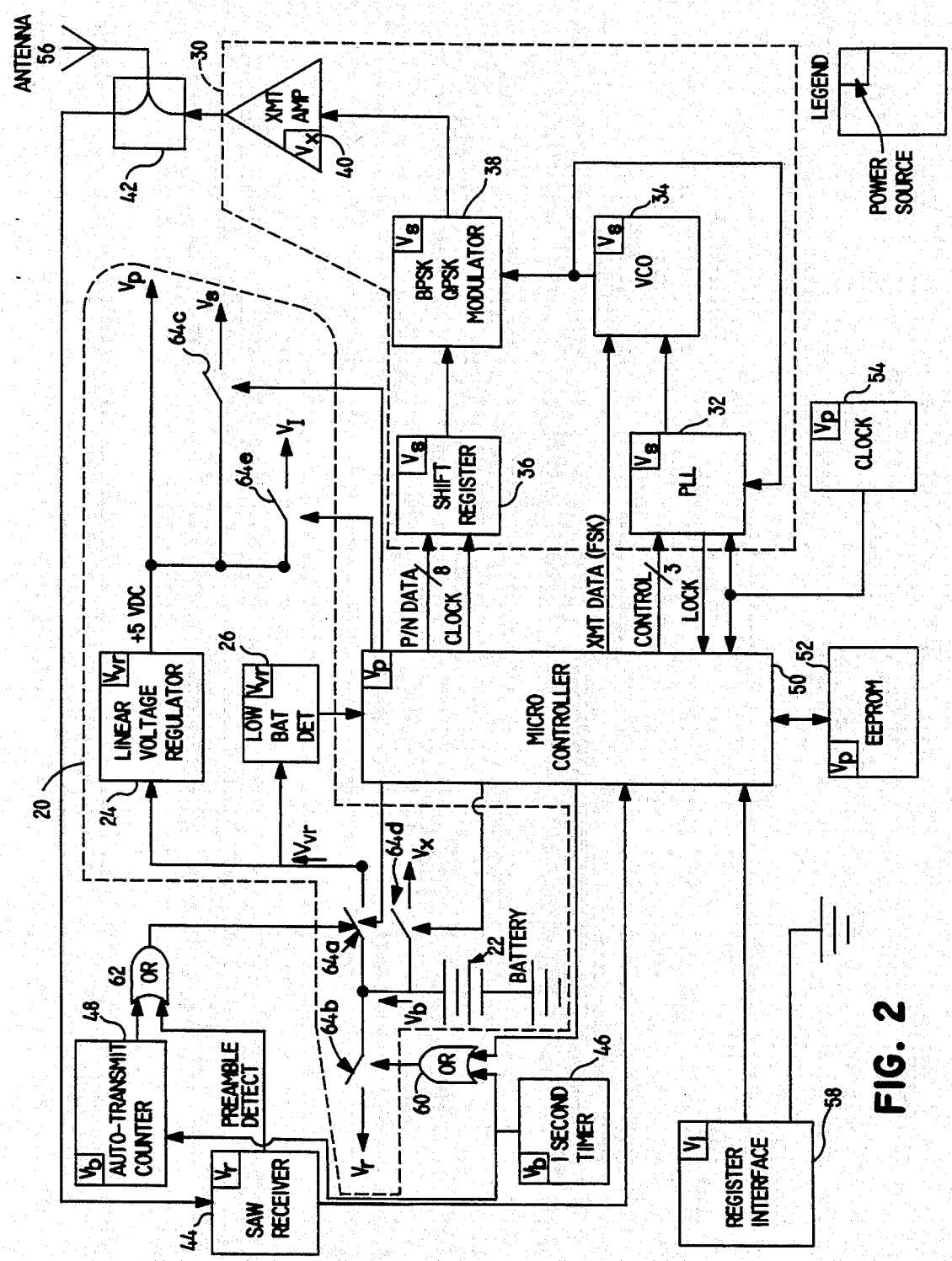
FIG. 2 is a block diagram of an instrument link of the present invention.
Figure 3A:
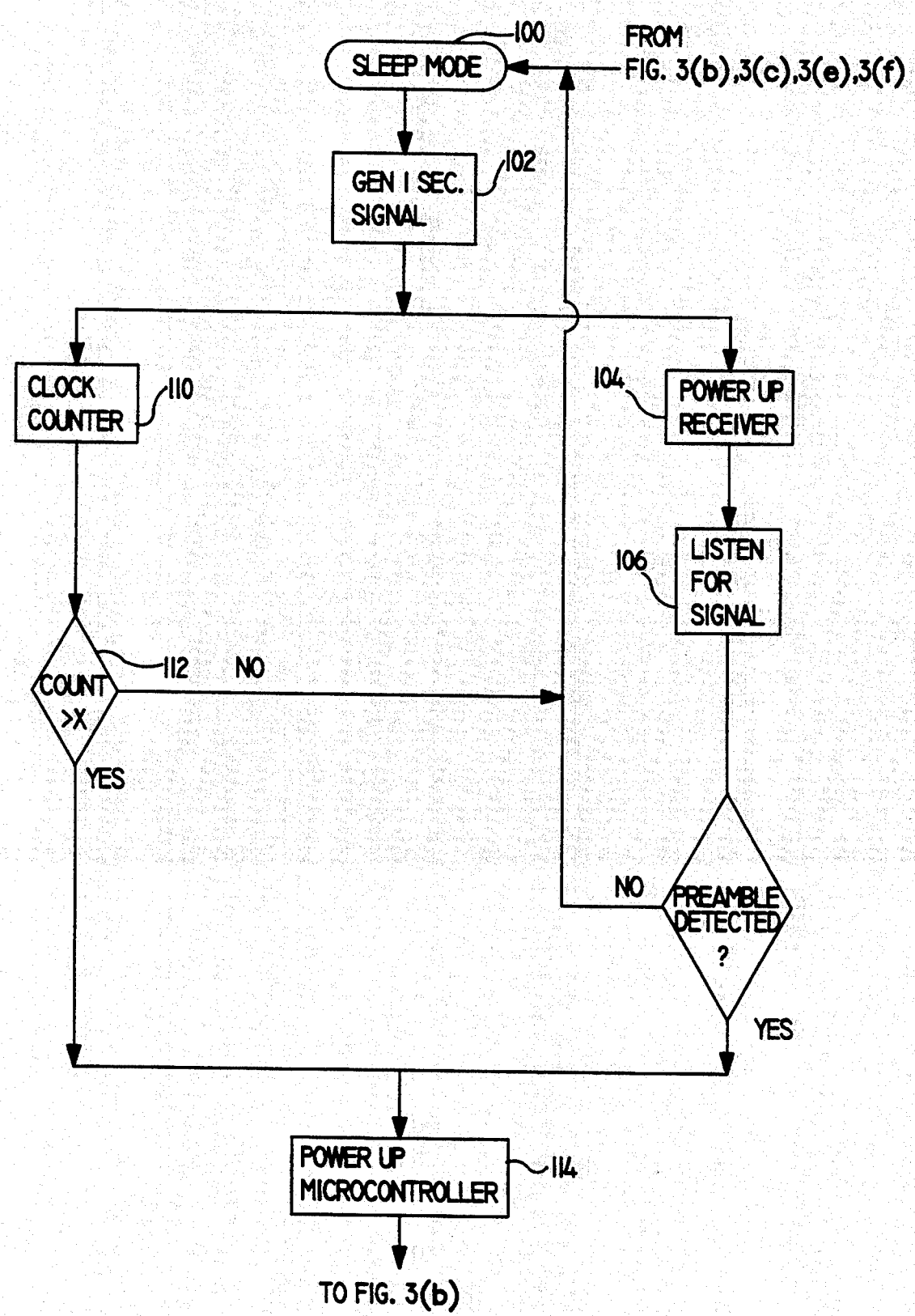
FIGS. 3a-f is a flow diagram of instrument link functions/operations.
Figure 3B:
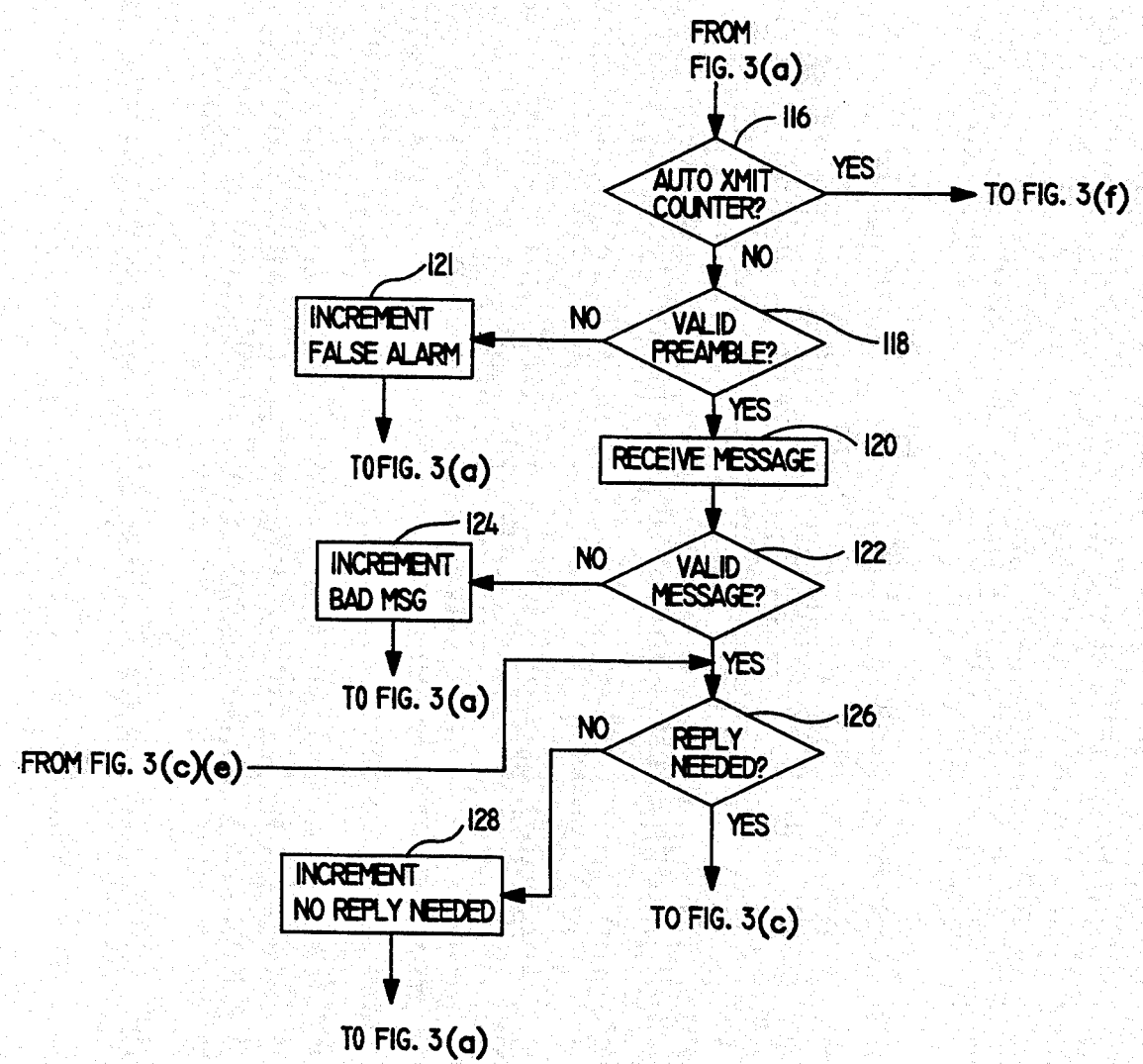
Figure 3C:
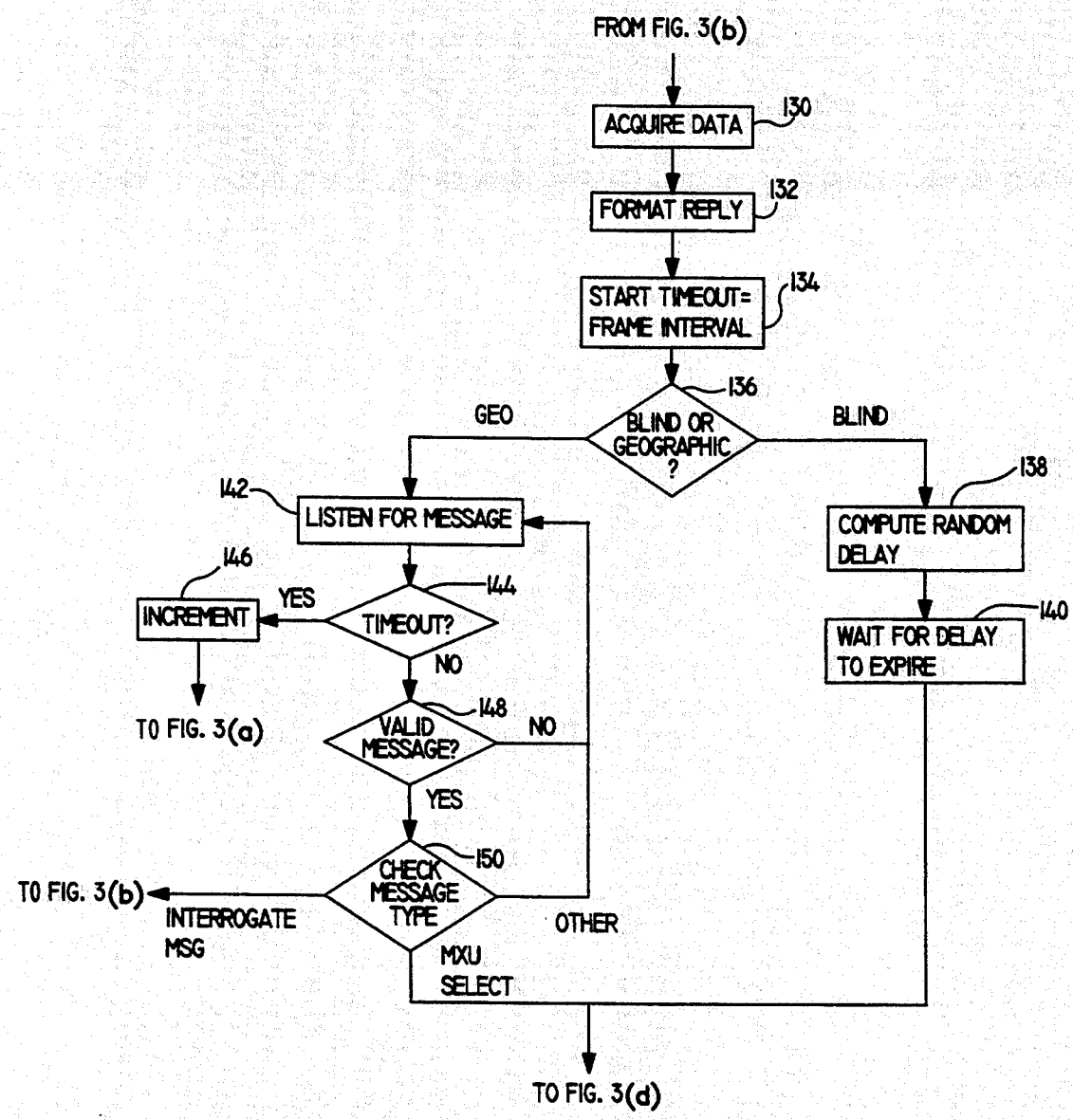
Figure 3D:
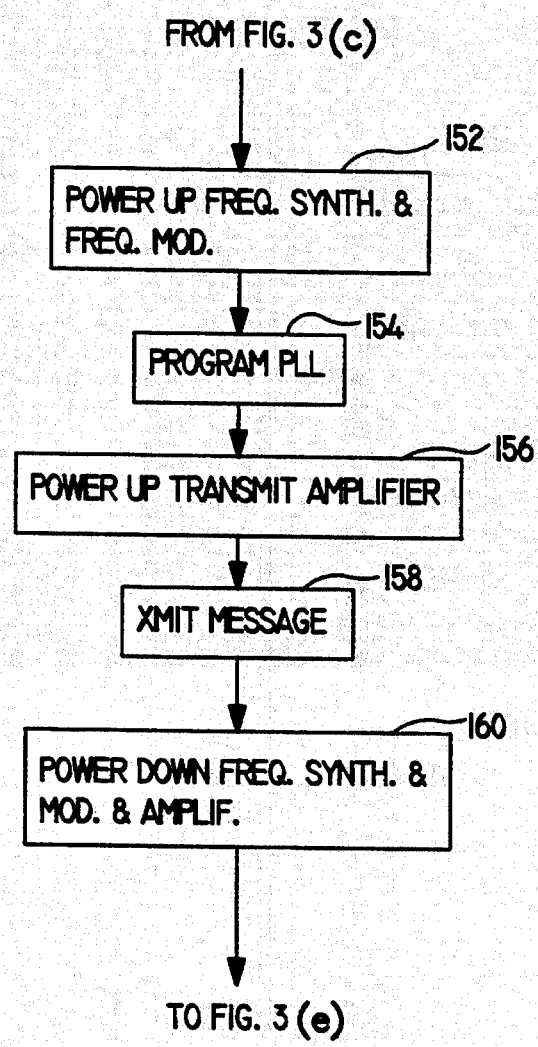
Figure 3E:
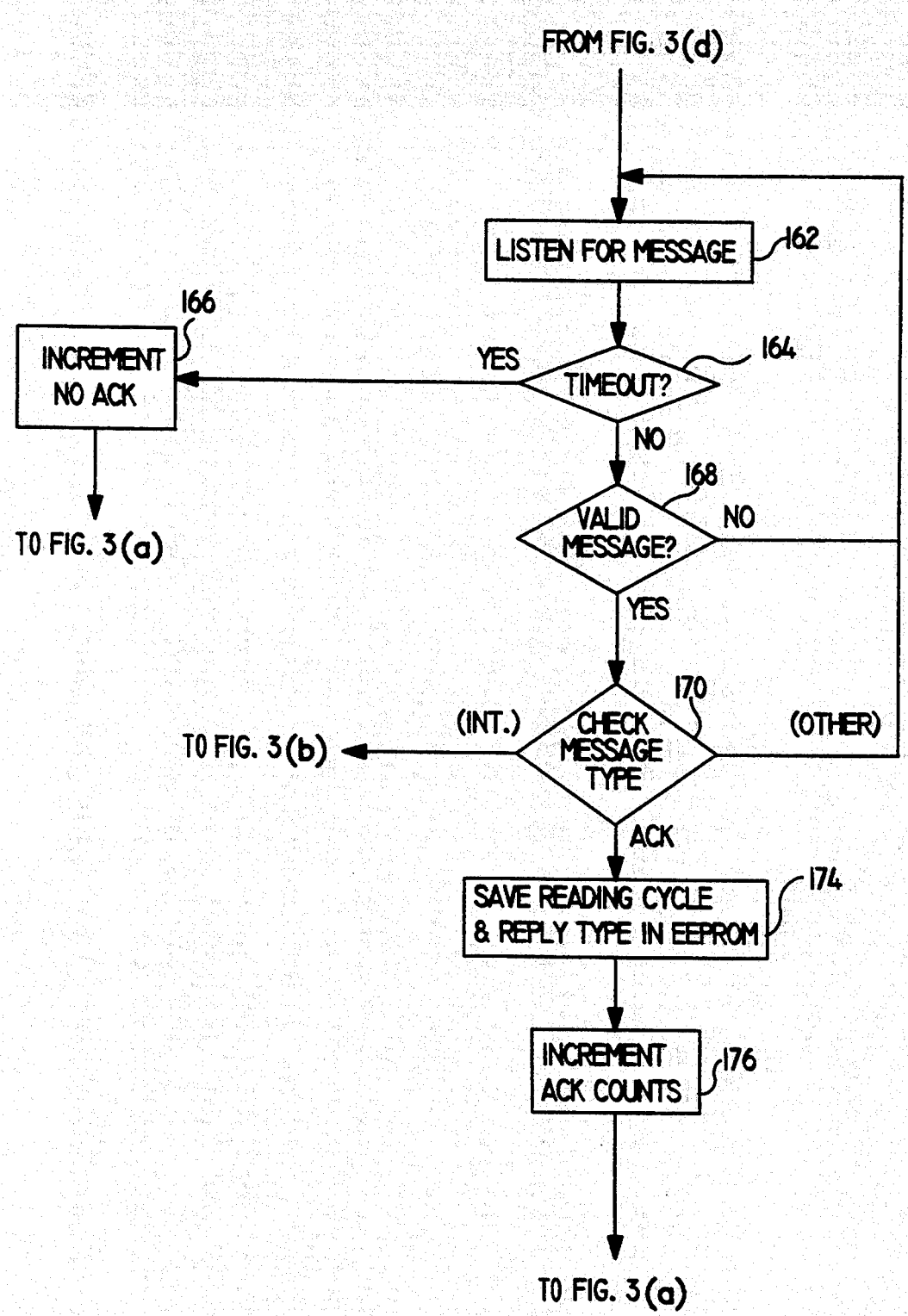
Figure 3F:
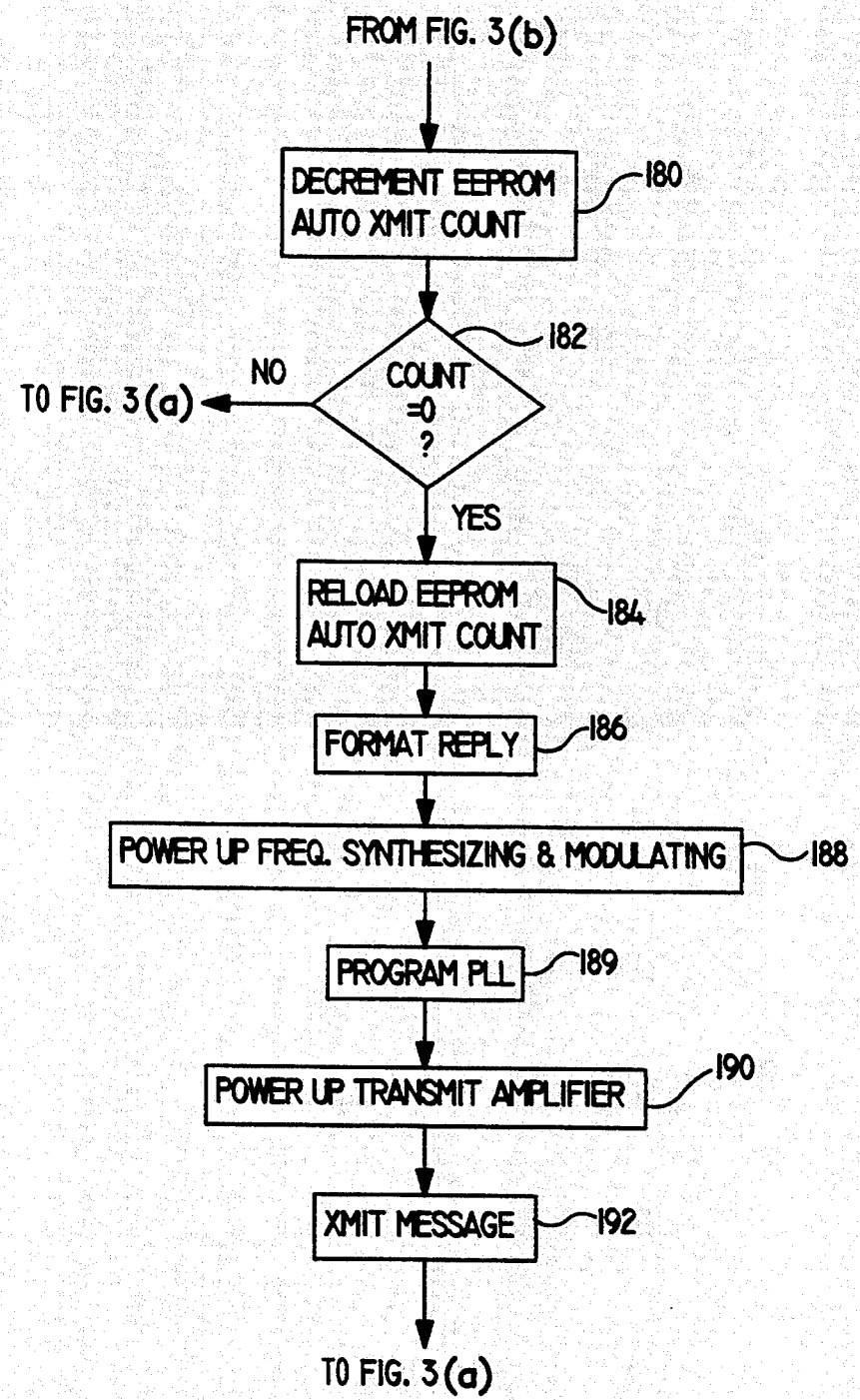

A block diagram of an instrument link 2 or instrument reading unit of the present invention is shown in FIG. 2. Each instrument link 2 includes a power supply 20, a receiver 44, a tunable transmitter means 30, an antenna 56a, a microcontroller 50, an Electronically Erasable Programmable Read-Only Memory (EEPROM) 52, and timing components.

The power supply 20 includes a battery 22, a voltage regulator 24, a low voltage detector 26 and a plurality of power control switches 64a–e. These switches, as described below, switchably connect functional circuits of the instrument link 2 to the battery 22 and/or the voltage regulator 24 such that the functional blocks are powered only during specified periods of instrument link activity. By conserving battery power it is expected that the instrument link 2 will operate in normal applications for a minimum of 10 years without a battery 22 replacement.

Since the preferred embodiment of the instrument link 2 is a self powered unit, the power supply 20 includes a battery 22. The battery 22 is preferably a six(6) volt lithium manganese dioxide battery. While the instrument link 2 is configured to be a self-powered unit that is not a limitation and the instrument link may in certain applications be powered from a fixed power source (e.g., household current, solar cell) or involve the use of a battery 22 in conjunction with one of theses separate power sources.

The voltage regulator 24 is a very low dropout (e.g., 100 mV) circuit that provides smoothed power supply voltages to the microcontroller 50 and to that subject to the microcontroller's control except for the transmitter amplifier 40. Preferably, the linear regulator 24 provides a +5 Vdc voltage output. The linear voltage regulator or equivalent circuit may be any of those known in the art for smoothing the output voltage of a battery.

The linear voltage regulator 24 is switchably connected to the battery 22 via a first power control switch 64a. When the first switch 64a is closed, the battery 22 supplies power to the voltage regulator 24. As described below, the first switch 64a is closed and remains closed, in response to activation signals from the receiver 44 or the auto-transmit counter 48. The first switch 64a is opened by the microcontroller 50 when the instrument link is to be put into its powered down or sleep mode as also described below.

The low battery voltage detector 26 consists of an integrated microcomparator and switch that monitors the battery terminal voltage. When the terminal voltage drops below a predetermined level, the detector 26 provides an output signal to the microcontroller 50. When a reply message is sent out by an instrument link 2, the micro-controller 50 includes data in the reply message to indicate that the battery 22 must be replaced. Typically, an indication is supplied when the battery 22 has deteriorated such that the battery should be changed out within six months of the signal. The power supplied to the detector 26 is switchably controlled by the first power supply control switch 64a that is described above.

The one second timer 46 is directly connected to the battery 22 at all times so it runs independently of the rest of the instrument link 2. The one second timer 46 provides an output pulse every second to a first OR gate 60. The first OR gate 60, when it receives this output pulse, provides an output that closes the second power supply control switch 64b so the battery 22 is connected to the instrument link receiver 44. The second switch 64b remains closed for a prespecified period of time so the link receiver 44 is periodically turned to listen for an interrogation signal preamble from the remote station 6 (FIG. 1). Preferably, the receiver 44 is turned on for 5 milliseconds once per second.

The one second pulse outputted from the one second timer 46 is also used to clock the auto-transmit counter 48, a fourteen(14) bit counter known in the art. The auto transmit counter 48 is also connected directly to the battery 22, so the counter 48 operates independent of the rest of the instrument link 2 like the one second timer 46. Each time the count for the auto-transmit counter 48 rolls over, the auto-transmit counter provides an output signal to a second OR gate 62. Receipt of an auto-transmit counter output signal causes the second OR gate 62 to output a signal that also closes the first power control switch 64a so the battery 22 is connected to the voltage regulator 24. The powering up of the voltage regulator also results in the microcontroller 50 being powered up or turned on.

The instrument link receiver 44 preferably is a surface acoustic wave (SAW) delay line stabilized receiver as is known in the art. A SAW receiver is used because of it's improved sensitivity (i.e., 20 dBm), improved temperature stability and the narrower bandwidth (i.e., 800 kHz vs. 6 MHz) over the other types of receivers that have been used in meter reading applications. As indicated above, the link receiver 44 is turned on every second for a short period of time to detect the presence of a 1.8 kHz signal modulating the 956 MHz RF carrier. The 1.8 kHz signal is the interrogation signal preamble. The instrument link receiver 44 includes an integrated circuit to detect the presence of this tone preamble.

When an interrogation signal preamble is received, the link receiver 44 outputs a signal to the second OR gate 62. This receiver output signal causes the second OR gate 62 to output a signal that closes the first power supply control switch 64a as described above to power up the voltage regulator and consequently the microcontroller 50. These components remain powered up until the first switch 64a is opened by the microcontroller 50.

The instrument link 2 includes a clock 54 that provides the reference frequency for instrument link timing functions (e.g., microcontroller 50) excluding the one second timer 46 and the auto-transmit counter 48. Preferably, the clock 54 is a 12 MHz crystal controlled oscillator circuit.

The instrument link 2 includes a microcontroller 50, such as an INTEL 8051 family integrated circuit, to evaluate signals from the remote station 6 and to control all the instrument link functions except those associated with the one second timer 46, the auto transmit counter 48 and the functions associated with these components (e.g., periodic listen for preamble by link receiver 44). The specific functions and operations of the microcontroller 50 are described in connection with the discussion of FIGS. 3a–f.

The Electrically Erasable Programmable Read-Only Memory (EEPROM) 52 interfaces with the microcontroller 50 through a serial interface and provides one (1) kilobit (Kbit) of non-volatile storage. The EEPROM 52 provides a means for storing configuration parameters and data that must be saved when the microcontroller 50 is powered down (i.e., the instrument link sleep mode). For example, the EEPROM 52 stores diagnostic data relating to the performance of the instrument link 2 and a remote station 6. The EEPROM 52 may be a Thompson 93C46 or equivalent.

The instrument link 2 includes a transmitter means 30, tunable to a plurality of frequencies and which can be configured to use spread spectrum or narrow-band modulation techniques. In all operating modes and applications where regulations allow unlicensed operation, the instrument link transmitter means 30 is preferably configured to use spread-spectrum radio frequency (RF) modulation for maximum immunity to interference from competing RF sources and non-man-made noise in the transmission band. Where regulations do not permit unlicensed spread-spectrum modulation, the transmitter means 30 is configured to use narrow-band modulation. In the United States, unlicensed spread-spectrum modulation transmissions at or below specified power levels is permitted by FCC regulations.

Spread spectrum modulation is a RF modulation technique that spreads transmitted signal energy over a very wide band width. This is accomplished in one of three primary methods: (1) direct sequence, (2) frequency hopping or (3) a hybrid mode involving a combination of the direct sequence and frequency hopping techniques. In direct sequence, the base-band signal is modulated with a spreading function, referred to as a pseudorandom (PN) code, and the carrier is Bi-Phase Shift Key (BPSK) modulated or Quadrature Phase Shift Key (QPSK) modulated to produce the wide-band signal. For frequency hopping the carrier frequency is rapidly shifted in a fixed sequence representing the spreading function. Both techniques spread carrier energy in proportion to the spreading function.

Using the spread spectrum modulation technique, the present invention is able to achieve ranges in excess of ten miles, whereas unlicensed systems using conventional modulation techniques attain ranges on the order of 500–1000 feet. Because the spread spectrum signal produces a low interference level, the FCC presently allows unlicensed operation at output power up to 1 watt, whereas the FCC limits conventional modulation techniques to lower power outputs. The higher power output for spread spectrum modulation significantly increases the communication range for unlicensed systems. The improved signal-to-noise performance of the spread spectrum signal provides additional range increase.

The use of unique spreading functions also allows band sharing by multiple systems because the desired signal can be received and decoded in the presence of signals using different spreading functions. The simultaneous transmission of several signals using different spreading functions is referred to as Code Division Multiple Access (CDMA).

As indicated above, the direct sequence technique uses a high rate binary code to modulate the base band signal, and the signal thus spread then modulates a transmitter's RF carrier. The spreading code is a fixed length pseudorandom sequence of bits, called chips, which is constantly being recycled. The pseudorandom nature of the sequence achieves the desired signal spreading, and the fixed sequence allows the code to be replicated in the receiver for recovery.

The frequency hopping technique involves changing the RF carrier frequency from one frequency to another (i.e., hopping). The frequency sequence is determined by a pseudorandom list, which is used repeatedly, similar to the pseudorandom code for the direct sequence technique. The hybrid technique, which combines both techniques, uses a binary code to spread the signal and the carrier frequency shifts provided by a pseudorandom list.

The performance of a spread spectrum system in terms of its interference to other signals and to its own processing gain is a function of the pseudorandom code or the pseudorandom frequency sequence. The degree to which interference to other signals is reduced depends upon the length of the code (i.e., the number of chips—$2^x$ chips) or the number of channels in the frequency sequence. Processing gain for digital communications depends on the number of chips per data bit in the direct sequence system and/or the number of frequencies used in the frequency hopping system.

In the present invention, a full pseudorandom code sequence is used for each data bit, giving a processing gain calculated by the following equation:

$$GAIN = 10\log[\text{code length}].$$

For a pseudorandom code length of 64 chips, the processing gain is 18 dB and for a code length of 1024 chips, the processing gain is about 30 dB. In the present invention the length of the default code sequence is 64 chips. Other code sequences of greater length are selectable to optimize processing gain and date rate. In a preferred embodiment, the code sequence length is selected from one of the following: 64, 128, 256, 512, and 1024 chips.

Since each data bit is spread across a full code sequence, the data rate is a function of code length and chip rate (i.e., data rate=chip rate/code length). In a preferred embodiment of the present invention, the chip rate is fixed at 1,000,000 chips per second. Thus for the default code length of 64 chips the data rate is approximately 15.6 kbits per second. If the code length is increased to 1024 chips, the data rate would be reduced to approximately 1 kbit per second. In this way processing gain is increased at the expense of lowering the data rate.

For a hybrid system, the preferred embodiment involves using 23 frequency channels which gives an additional processing gain of approximately 14 dB. Thus, the total processing gain is increased to 32 dB when the default code length (i.e., 64 chips) is used and to 44 dB for a code length of 1024 chips.

As indicated above when unlicensed spread spectrum modulation is not authorized, the instrument link transmitter means 30 is configured to transmit using narrow band frequency shift key modulation. The instrument link 2 of the present invention can be configured for narrow band or spread spectrum operation by means of a command sent out to the instrument link 2 from the remote station 6. When configured to the narrow band mode the transmitter means 30 of the present invention has a range of approximately 1500 meters. In addition to operating at frequencies in the 900–930 MHz band, the link transmitter means 30 can be modified to transmit in a frequency band of 100 to 1000 MHz.

Any operation frequencies and power levels specified herein are some examples of the operating frequencies and power levels for transmissions in the United States. However, for other applications (e.g., other countries), the frequencies and power levels selected are governed by the applicable rules and regulations. For example, in the United Kingdom, the instrument link transmitter means 30 may operate in a frequency band between 183.5 MHz to 184.5 MHz.

The transmitter means 30 includes a phase locked loop (PLL) 32, a voltage-controlled oscillator (VCO) 34, a shift register 36, a BPSK/QPSK modulator 38, and a transmit amplifier 40. The PLL 32, the VCO 34, the shift register and the BPSK modulator 38 are switchably connected to the voltage regulator by a third power supply control switch 64c. The transmit amplifier is switchably connected to the battery 22 by a fourth power supply control switch 64d. The third and fourth switches 64c,d are under the control of the microcontroller 50. The third switch 64c is closed by the microcontroller 50 to supply power only if it is determined that a reply message is to be transmitted by the instrument link 2. The fourth switch 64d is closed by the microcontroller 50 to supply power only if a reply message is to be transmitted and preferably only after the PLL 32 has locked the transmit frequency for the instrument link transmission means 30.

The phase locked loop (PLL) 32 controls the RF frequency generated by the voltage-controlled oscillator (VCO) 34. The PLL 32 uses divider chains and a phase comparator to allow generation of any frequency in the preferred range of 900 to 930 MHz in 25 kHz steps. As discussed below, the PLL 32 is programmed by the microcontroller 50 to generate the required frequency.

The shift register 36 is an 8-bit parallel-in/serial-out type of register that is used to serialize the pseudorandom (PN) code supplied by the microcontroller 50. In a preferred embodiment, the serial data is shifted out of the register at a 1 MHz rate. The BPSK/QSPK modulator 38 uses the shift data from the shift register 36 to modulate the RF carrier from the VCO 34. The modulator 38 can be configured to provide binary phase shift key (BPSK) or quadrature phase shift key (QPSK) modulation.

The link transmit amplifier 40 is a linear amplifier known in the art capable of delivering 200 milliwatts(mW) to the instrument link antenna 56, although FCC regulations do permit outputs of 1 watt. The link antenna 56 is preferably located within the housing (not shown) for the instrument link 2. However, an external antenna may be used when required for a given application. The instrument link also includes a transmit/receive network means 42 which directs signals being received by the link antenna 56 to the receiver 44 and which directs signals to be transmitted from the transmit amplifier 40 to the link antenna 56.

The instrument link 2 includes a register interface 58 for use with instruments or data gathering devices 4 (see FIG. 1) containing electronic data registers. The interface 58 includes a power output to the data register and a data input to the microcontroller 50. The interface power output is switchably connected to the voltage regulator 24 by a fifth power supply control switch 64e that is under the control of the microcontroller 50. To initiate a reading of the data gathering unit, the microcontroller 50 closes the fifth switch 64e so the data gathering device or register is powered up. The register interface 58 is compatible with data registers used by water meters manufactured by Sensus Technologies, Inc. and with the data registers used by gas meters manufactured by Equimeter, Inc.

A flow diagram of instrument link operations/functions, in particular those for the microcontroller 50, is contained in FIGS. 3a–f. Reference should also be made to FIG. 2, for the instrument link functional blocks specifically contained in the following discussion. As described in connection with FIG. 2 above, with the exception of the one second timer 46 and the auto-transmit counter 48, the rest of the instrument link 2 is powered down most of the time. This powered down state is called the sleep mode, step 100. During the sleep mode, minimal power is consumed—e.g., the one second timer 46 consumes less than 2 microamps.

Once every second a signal is generated by the one second timer 46, step 102, which signal causes the link receiver 44 to be powered up for a preset time interval, step 104. While the receiver 44 is powered up it monitors or listens to the frequency band used by a remote station for transmission of interrogation messages and message wake up preambles, step 106. As indicated above, the receiver 44 is preferably turned on so that it listens for 5 ms every second for a wake up preamble.

The signals detected in the specified frequency band are evaluated to determine if the signal received is an interrogation signal preamble, step 108. If a preamble is detected (YES), then the microcontroller 50 is powered up or turned on, step 114. The link receiver 44 also remains powered up if a preamble is detected. If a preamble is not detected (NO) during a listening interval then the link receiver 44 is powered down and the instrument link 2 is instructed to go back to sleep, step 100.

The one second signal generated, step 102, also clocks the auto-transmit counter 48, step 110. This results in the auto-transmit counter 48 being initialized by one for every signal received. The number of counts received is evaluated to determine if the number exceeds a prespecified value, step 112. If the count is less than the prespecified value (NO), then the instrument link is instructed to go back to sleep, step 100. If the count exceeds the prespecified value (YES), then the microcontroller 50 is powered up, step 114. Also powered up at this time are the EEPROM 52 and the clock 54.

Once the microcontroller 50 is turned on, step 114, then all the remaining instrument link operations proceed under the control of the microcontroller. An evaluation is next made to determine if the microcontroller 50 was turned on because of the auto-transmit counter, step 116. If it was not turned on by the auto-transmit counter (NO), then an evaluation is then made to determine if the microcontroller was powered up by a valid preamble, step 118. If a valid preamble was not detected (NO), then a false alarm register means of the EEPROM 52 is incremented by one, step 121 and the instrument link 2 is instructed to go back to sleep, step 100.

An interrogation signal preamble is followed by a interrogation message that is preferably a Manchester encoded message at a data rate of 1 kbit per second. The interrogation message contains a variety of parameters including the interrogation mode (blind or geographic), instrument link ID with possible wild cards, reply window length, reply RF channel to be used, the pseudorandom code to be used for spread spectrum modulation, the reading cycle number, and the data to be transmitted (i.e., register reading or diagnostic information). Such a message is typically protected against transmission bit errors by a 16 bit CRC field.

If a valid preamble is detected (YES), then the microcontroller 50 acquires the interrogation message, step 120. Using the CRC code, the interrogation message is evaluated to determine if a valid message was received, step 122. If a valid message was not received (NO), then a bad message register means of the EEPROM 52 is incremented by one, step 124 and the instrument link 2 is instructed to go back to sleep, step 100.

If a valid message is received (YES), then the interrogation message is evaluated to determine if a reply from a given instrument link is required, step 126. This is done because there are a plurality of possible operating modes and since a remote station repeats the interrogation message to assure receipt of data from all the instrument links being interrogated. If a given instrument link 2 has already replied or of the message does not apply to the instrument link (e.g., another instrument link is being interrogated), then the instrument link will determine that a reply is not required.

For example, in the blind mode the instrument link ID, the reading cycle number and data to be transmitted fields of the interrogation message are evaluated to determine if a reply from a given instrument link is needed. If the link ID number specified in the interrogation message does not apply to the instrument receiving the message, then that link will conclude that a reply from it is not required.

If no reply is needed (NO), then a no reply needed register means of the EEPROM 52 is incremented by one, step 128 and the instrument link 2 is instructed to go back to sleep, step 100. If a reply is needed (YES), then the microcontroller 50 acquires the data to be transmitted from the data gathering device (i.e., a register reading) or diagnostic information from the EEPROM 52, step 130. After acquiring the data to be transmitted, the microcontroller formats the reply message in its memory, step 132. The reply message includes, the data to be transmitted, the instrument link ID, and a 16 bit CRC field to be used for detection of transmission errors. The message may also include a status field to report various conditions of the instrument link 2 including low battery voltage, instrument tampering and other malfunctions. Before proceeding further the blind and geographic interrogation operating modes will be described.

In the blind mode a remote station 6 interrogates groups of instrument links simultaneously. In the present invention this is accomplished by using wild cards to replace one or more digits (i.e., bits) in the instrument link ID number included in the interrogation message. For this discussion it should be assumed that the ID number is in binary form. The instrument links 2 recognize wild cards as representing either a binary one or zero bit. For example, instrument links having ID numbers 11100101 and 01100101 would reply to an interrogation message having the ID number *1100101, where the wild card is represented by an asterisk (*). If a wild card is substituted for all bits of the instrument link ID, a universal ID is created which would address all instrument links within the range of the remote station 6, FIG. 1.

In the geographic mode the remote station 6 provides an initial interrogation message to put the instrument links 2 being interrogated into standby. In standby, each powered up instrument link listens for another message specifying the full instrument ID number before replying. The geographic mode is so called because if data is to be retrieved from a given instrument link, the remote station 6 must know its own location and the corresponding location of the instrument links 2 to ensure that the remote station is within communication range of the instrument links. If the remote station 6 is fixed, navigational information is not required as the data base for the fixed remote station will contain only ID numbers of instruments links 2 within communication range of the remote This operating mode allows transmission of specific instructions along with the interrogation message so that functions at a specific instrument link is commanded and controlled from the remote station.

After formatting the reply message, step 132, the frame interval for a given reading cycle is determined and a time out clock algorithm is started by the microcontroller 50 to determine when time has run out for a given reading cycle, step 134. The interrogation message is then evaluated to determine whether the interrogation message supplied operating mode of the instrument links for the reading cycle is blind or geographic, step 136.

If the specified operating mode is the blind mode (BLIND), a random delay for transmitting the instrument link's reply message is computed, step 138. The interrogation message contains a code specifying the length of a window or interval during which the remote station will listen for replies from the instrument links. The timing of each instrument link's reply is randomized within the specified window so that replies from different instrument links are staggered, thereby reducing the possibility of signal collisions (i.e., simultaneous receipt of replies from instrument links). The microcontroller 50 waits for the time delay to expire, step 140, at which time the formatted message is transmitted from the instrument link 2 to the remote station 6.

If the specified operating mode, step 136, is the geographic mode (GEO), then each powered up instrument link waits and listens for an instrument link select message containing the ID number for the instrument link which is to reply at that time, step 142. The instrument link continues to listen until the microcontroller determines that the time has run out for the specified reading cycle window, step 144. If a message is not received (YES) by an instrument link before the time runs out, the time-out register means of the EEPROM 52 is incremented, step 146 and the instrument link 2 is instructed to go back to sleep, step 100.

If a message is received from the remote station before the time runs out (NO), then the message received is evaluated to determine if it is a valid message, step, 148. If a valid message is not received (NO), the instrument link returns to listening for a message, step 142. If a valid message is received (YES), then the message type is evaluated to determine if it is another interrogation message, an instrument select message or another type of message, step 150.

If another interrogation message is received, another evaluation is made to determine whether a reply from the instrument link is needed, step 126. If another message type is received, other than an instrument select or interrogation message, then the instrument link 2 returns to listening for a message, step 142. For example, an instrument link can receive an acknowledgment message being sent to another instrument link.

If an instrument select message is received before the time runs out in the geographic mode, step 150 or if the random time delay has expired in the blind mode, step 140, then the microcontroller 50 provides output signals to the appropriate switches and functional blocks of FIG. 2 so the formatted message is transmitted from the instrument link to the remote station.

To transmit the reply message, the frequency synthesizing and modulating components are powered up, step 152. The frequency synthesizing and modulating components include the PLL 32, the VCO 34, the shift register 36 and the BPSK/QPSK modulator 38. The PLL 32 is programmed by the microcontroller 50 to synthesize the RF carrier corresponding to the clear reply channel identified in the interrogation message, step 154. Once the PLL 32 is locked, the transmit amplifiers are powered up, step 156.

The preformated message in the microcontroller's memory is then transmitted to the remote station, step 158. For spread spectrum modulation, the formatted reply message consists of parallel PN encoded data, which is serialized by the shift register 36 to modulate the carrier in the BPSK/QPSK modulator 38. For narrow-band FSK modulation, the transmit data is sent by the microcontroller 50 directly to the VCO, where it frequency shift-keys the carrier frequency. Since no parallel data is loaded into the shift register, the BPSK modulator passes the VCO signal unchanged for transmission. After transmitting the message, the microcontroller 50 powers down the frequency synthesizing and modulating components and the transmit amplifiers, step 160.

After transmission in either the blind or geographic modes, the instrument link waits and listens for a message from the remote station, step 162. The instrument link continues to listen for a message until the time has run out for the specified reading cycle window, step 164. If a message is not received (YES) by an instrument link before the time runs out, a no acknowledgment register means of the EEPROM 52 is incremented, step 166 and the instrument link is instructed to go back to sleep, step 100.

If a message is received after a reply has been sent but before the time period runs out (NO), the message is evaluated to determine if it is a valid message, step 168. If a valid message is not received (NO), the instrument link continues to listen for a message, step 162. If a valid message is received (YES), then the message type is evaluated to determine if it is another interrogation message, an acknowledgment message or another type of message (e.g., an acknowledgment message to another instrument link), step 170.

If another interrogation message is received (INT.), another determination is made whether a reply is needed from the instrument link, step 126. If a reply is required, then the instrument link proceeds as described above. However, if an acknowledgment message is subsequently received for a previously transmitted reply message, the pending or new reply message is not sent and the instrument link is instructed to go back to sleep. If a another message type is received (OTHER), other than an interrogation or acknowledgment message, then the instrument link continues to listen for a message, step 162.

If a valid acknowledgment message is received (ACK) before the time for the current reading cycle has run out, step 170, then the current reading cycle number and reply type is saved in non-volatile memory of the EEPROM 52, step 174. The receipt of an acknowledgment message from the remote station is an indication that the the reply message sent was successfully received. The acknowledgment register means of the EEPROM 52 is also incremented to reflect the successful read, step 176. After updating the EEPROM's register means, the instrument link is instructed to go back to sleep, step 100.

Instrument links which have successfully transmitted the data to the remote station for a given reading cycle (i.e., those which have received an acknowledgment message), do no retransmit their data in response to another interrogation message with the current reading cycle number. As explained above, the step of determining whether a reply is needed, step 126, will sift out the instrument links which have successfully replied. Thus the parts of the instrument link involved with transmission and acquiring data will not be powered up which conserves battery power. Preventing re-transmission of data, also reduces the probability of signal collisions occurring for subsequent repeated interrogation messages.

As indicated above, after being powered up the microcontroller 50 determines if it was powered up because of the auto-transmit counter, step 116. That is the microcontroller 50 makes a determination whether the instrument link's auto transmission mode is to be enabled. Unlike, the blind and geographic modes, the automatic mode is essentially one way: the instrument link 2 automatically transmits data to the remote station at a prescribed interval. The remote station 6 is operated in a continuous listening mode to retrieve the transmitted data. Collision resistance is maintained by keeping data transmissions short, and loosely timing transmit intervals to ensure a random element in transmission timing. In this mode, the instrument link receiver is kept functional to process commands that may be sent to change operating mode, transmit interval, and other parameters.

Hybrid spread spectrum modulation is used in the auto transmit mode. In a preferred embodiment, a 1024 chip length pseudorandom code sequence is used along with eight pseudorandom frequency channels to maximize processing gain. Fixing the parameters to maximize processing gain is done because the instrument link does not use a transmission frequency and pseudorandom code length selected based on a prior evaluation of the background noise in the reply transmission band. It should be recognized that other chip code lengths and number of pseudorandom channels can be selected which would be appropriate for the transmission conditions of a given application. Alternatively, direct sequence spread spectrum modulation may be used when the given application does not require the hybrid modulation because of the processing gain and the concern with signal collisions.

There are a number of techniques available for narrow band modulation in the auto-transmit mode that are selected based on considerations of cost and operating conditions for a given application. The instrument link can be configured to transmit on a preset frequency. The link could also be configured to transmit at a frequency from a list of randomly specified frequencies and rotating through this list for each reading cycle. The remote station could also periodically monitor the available transmission channels to select a channel that is clear. The instrument link is then instructed to transmit in this channel.

If the microcontroller 50 is powered up by the auto-transmit counter (YES), then the microcontroller decrements the count in a auto transmit count register means of the EEPROM 52, step 180. The auto-transmit count in the EEPROM's register means is evaluated to determine if the count, after it was decremented, is equal to zero, step 182. If the auto transmit count is greater than zero (NO), then the microcontroller provides directions so that the instrument link 2 goes back to sleep, step 100.

If the auto transmit count equals zero (YES), then the starting auto transmit count value is reloaded into the EEPROM's auto transmit register means, step 184. A reply message of the data gathered, such as a meter register reading, is formatted and stored in the microcontroller's memory, step 186. The microcontroller 50, as with the blind and geographic modes, then powers up the frequency synthesizing and modulating components, step 188, programs the PLL 32, step 189 and powers up the the transmit amplifiers, step 190.

The instrument link 2 then transmits the formatted reply message to the remote station 6, step 192. The microcontroller controls the shift register 36 and the PLL 32 to generate the hybrid spread spectrum signals. After transmitting the message, the microcontroller 50 instructs the instrument link 2 to go back to sleep, step 100.

Figure 4:
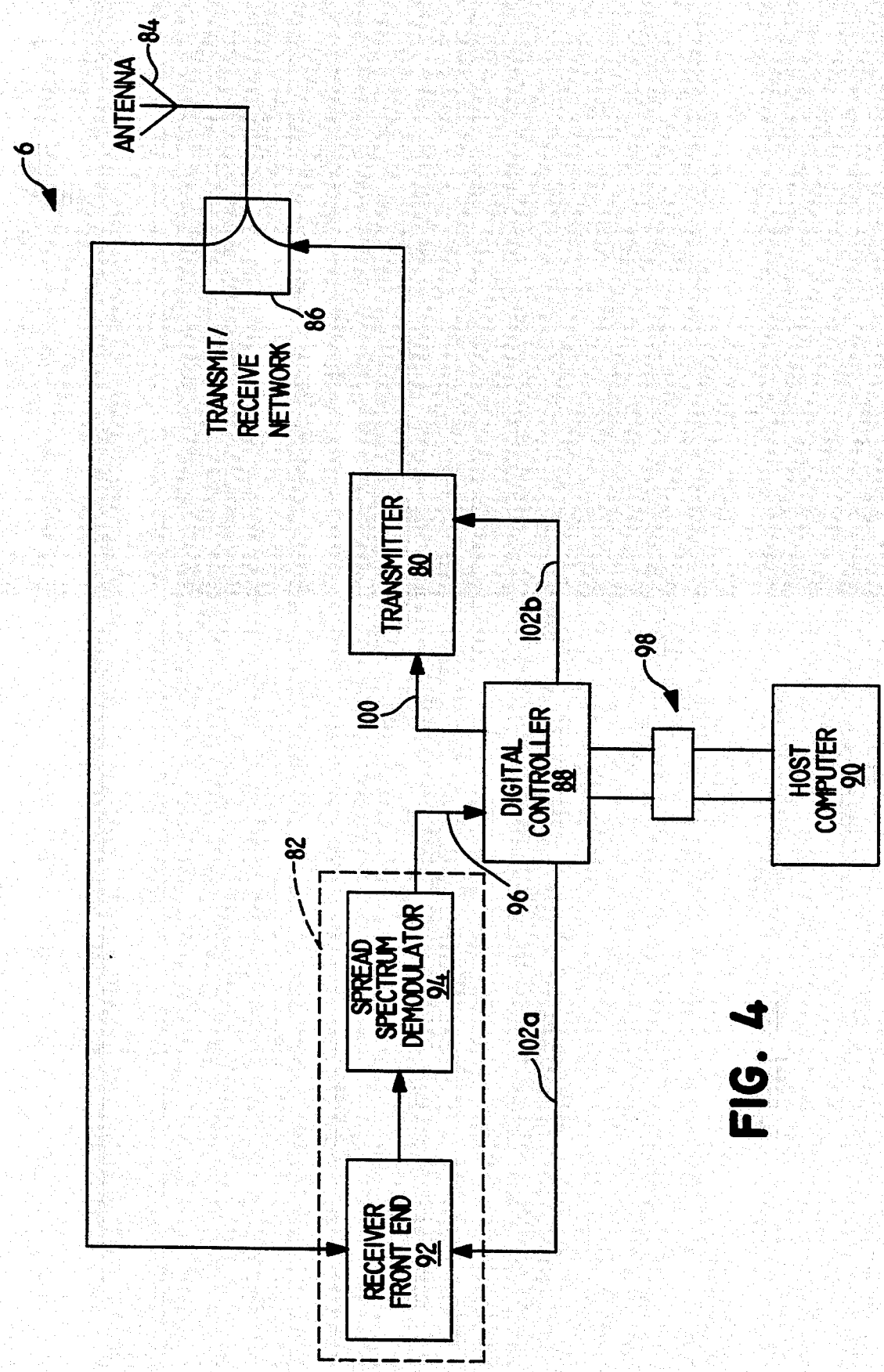
FIG. 4 is a block diagram of a remote station of the present invention.

Each remote station 6 of the present invention, as shown in FIG. 4, includes a transmitter means 80, an antenna 84, a transmit/receiver network means 86, a digital controller 88, a receiver means 82 and host computer 90. In a preferred embodiment all components except the antenna 84 and host computer 90 are contained in a single chassis.

The antenna 84 is external to the chassis and may be selected and placed in accordance with the performance requirements of a given application. As known in the art, antenna selection depends upon such requirements as location, range, and directionally. The transmit/receiver network 86 directs signals being received by the remote station's antenna 84 to the remote station receiver means 82 and directs signals to be transmitted from the transmitter means 80 to the antenna 84.

The remote station transmitter means 80 is a conventional narrow band amplitude shift key modulated transmitter. The remote station transmitter 80 is typically licensed to produce RF signals at the power output required to satisfy the operating range for a given application. For meter reading applications in the United States, the remote station transmitter 80 is designed for licensed operation in the 956 MHz band allocated for this purpose. The maximum allowable power output for licensed systems in this band is 20 watts. This power level in conjunction with the improved sensitivity of the present invention's instrument link receiver is sufficient for operating ranges of approximately 10 miles. For shorter range applications, the output power of the remote station transmitter 80 may be reduced. For other meter reading applications the transmission frequency and power level is selected based on the rules and regulations governing such transmissions for a given application.

Each remote station 6 includes a digital controller 88 that autonomously performs and controls numerous functions of the remote station 6. Specifically the digital controller interfaces with the host computer over an RS232 link 98; turns the remote station transmitter 80 on and off; generates the bit stream to modulate the transmitter 80; controls the receiver means 82 so it scans the various reply channels and evaluates the reply channel noise levels to select the best channel for system performance; validates and decodes the instrument link reply messages and sends them to the host computer; and autonomously generates the acknowledge message to be transmitted. For spread spectrum modulation operations, the digital controller also evaluates the reply channels to determine if a pseudorandom code length is being used that could interfere with system operation and assembles the bit stream outputted by the DPSK demodulator 94 of the receiver means 82 into received messages. The digital controller contains a microprocessor to perform its functions. The microprocessor may be an INTEL 80651.

As provided below, the remote station transmitter 80 is turned on and off by the digital controller 88. When turned on, the transmitter 80 takes the baseband data provided by the controller 88 over line 100 and amplitude modulates the RF carrier. The baseband data generated by the controller 88 is the instrument link wake up preamble or the manchester encoded messages (e.g., interrogation messages) recognized by the instrument link 2. The RF carrier frequency is usually fixed for a given application, however, the transmitter 80 is tunable to a number of different frequencies under the control of the digital controller 88.

In the present invention, the spread spectrum band from 902 to 928 MHz is divided into 56 overlapping channels with center frequencies 400 kHz apart. Before interrogation of the instrument links, the digital controller 88 tunes a local oscillator in the first IF stage of the receiver front end 92 to all 56 channels and reads the reply channel noise level. From the noise level information, the digital controller 88 selects the clear channel to be used by the instrument links for reply message transmissions. During the subsequent interrogation, the digital controller 88 sets the local oscillator in the first stage of the receiver front end 92 to the appropriate frequency for the selected reply channel. In this way, the reply message from the instrument link 2 that is being transmitted in this channel will be received.

For narrow band FSK operations, the digital controller 88 tunes the receiver means to each of the available narrow band channels being used to identify a clear channel. This clear channel is then communicated to the instrument link so the reply message is transmitted in this channel.

For spread spectrum modulation, information recovery at the receiving end depends upon the energy spreading technique. If a direct sequence is used, the spread base band signal is recovered from the carrier by BPSK or QPSK demodulation, and the spreading function (i.e., the PN code) is replicated to despread the base band signal for recovery. If frequency hopping is used, the spreading function is replicated and used to despread the carrier to a single intermediate frequency and the information is recovered using conventional demodulation techniques.

For spread spectrum modulation applications, the receiver means 82 includes a receiver front end 92 and a spread spectrum demodulator 94. The receiver front end's circuitry is tunable by the digital controller 88 to any of a number of different frequency channels. Once tuned to a specific reply channel, the receiver front end 92 downconverts the incoming RF signal, in two stages, into a fixed, low, intermediate frequency (4 MHz) signal. This signal is downconverted to two baseband signals, in quadrature (I and Q), in the spread spectrum demodulator 94. The spread spectrum demodulator 94 performs a digital correlation of the I and Q signals against a stored copy of the pseudo-noise sequence used by the transmitting instrument links 2.

The despread data and clock are sent from the spread spectrum demodulator 94 to the digital controller 88 over line 96. The digital controller 88 reassembles the instrument link messages and validates, decodes and sends them, via the RS232 interface 98, to the host computer 90.

The host computer 90 receives and stores the instrument link messages. Additionally, the host computer 90 tracks the number of collisions in the blind mode and continually fine tunes a variety of system parameters such as channel selection, receive window length, and wild cards to achieve optimal system performance. The host computer 90 may also contain a data base of the instrument links 2 within communication range of a remote station for operation in the geographic mode. For mobile stations, the host computer 90 may be connected to a navigational system to continuously update its position.

The receiver front end 92 is a dual conversion design using surface acoustic wave (SAW) filters in the first IF stage. The design combines very low noise performance with very high dynamic range. The receiver front end 92 is designed for operation at a variety of frequencies with minor modifications, however, in a preferred embodiment the receiver front end operates in the 902-928 MHz band.

The RF amplifier and RF bandpass filters (not shown) of the receiver front end 92 are conventional circuits that produce a linear amplified signal within the the 902-928 MHz band. Linearity through an 80 dB dynamic range is obtained by using automatic gain control as explained below.

The first IF stage (not shown) of the receiver front end 92 includes a frequency synthesizer as a local oscillator (LO1) that is programmed by the digital controller 88. The controls from the digital controller are provided over a control line 102a. As indicated above, in a preferred embodiment of the present invention the digital controller 88 can program the local oscillator to adjusts the frequency of the selected channel from one of 56 overlapping 1 MHz channels in the 902-928 band. This adjustment can be made to handle spread spectrum signals using either the direct, the frequency hopping or hybrid modulation techniques. The signal output from the first IF stage is further processed, filtered and amplified in a second IF stage (not shown). Automatic gain control is also applied to the second stage amplifier.

Automatic gain control (AGC) is implemented by a two stage design providing an 80 dB control range. For the range in 0 to 60 dB, the AGC signal is applied to the second stage IF amplifier. For the control range between 60-80 dB, the AGC signals are applied to the RF amplifier.

The processed instrument link signals from the second IF stage are provided to the spread spectrum modulator 94. The spread spectrum demodulator 94 is in large part implemented with application specific integrated circuits and includes the following components (not shown) a numerically controlled oscillator, mixers, analog to digital converters, digital correlators, a microprocessor and a DPSK demodulator.

The spread spectrum modulator's numerically controlled oscillator (NCO) followed by a analog-to-digital converter generates two signals in quadrature that are mixed with the output signal from the second IF stage of the receiver front end 92 to generate the baseband I and Q signals. These two signals are first filtered and then digitized in the analog-to-digital converters at twice the chip rate (2 MHz) to be inputted into the digital correlators. Alternatively, the output signal from the second IF stage of the receiver front end 92 may be digitized first and the mixing with the NCO output performed with digital multipliers.

Any difference between the receiver front end second IF stage output signal and the generated NCO signal shows up as a beat frequency modulating the baseband PN sequence. However, since the I and Q channels are in quadrature, when the I channel is at a zero level the O channel is at its maximum and viseversa.

The NCO is under the control of the spread spectrum modulator's microprocessor which can vary the NCO frequency in 250 Hz steps. This control feature is used for initial signal acquisition and frequency tracking.

The digital correlation is performed independently in both I and Q signals. A full correlation is performed in every clock cycle, which runs at twice the chip rate (2 MHz). The I and Q signal samples are clocked into shift registers having a length equal to twice the PN code length. In every clock cycle each alternate value in the shift register is multiplied by 1 or −1 depending on the PN code being used (the PN code is loaded at initialization time by the microprocessor).

The outputs of all the multipliers are then added to form the $I_{sum}$ and $Q_{sum}$ values. and the magnitude is computed with an approximation algorithm. This magnitude, representing the correlation value between the incoming signal and the PN code is compared against a threshold value. If that threshold value is exceeded a detect pulse is generated. When this happens the magnitude is latched to be read by the microprocessor in the frequency tracking algorithm.

When a signal is being received, detect pulses appear at the output of the correlator at exactly the data rate. This detect pulse train is therefore the recovered clock.

The $I_{sum}$ and $Q_{sum}$ samples at the time of the detect pulse are sent to the spread spectrum demodulator's DPSK demodulator. Demodulation is performed by generating the complex conjugate product between two consecutive samples. The phase difference between these consecutive samples is the sum of the data modulation (0 or 180 deg. in BPSK) and the phase rotation due to the difference in frequency between the local oscillator and the received signal. When this difference in frequency is small, the sign of the real part of this conjugate product is the demodulated data. That sign bit is routed to the digital controller to reassemble the received message.

For the demodulation scheme of the present invention to work properly, the remote station's receiver front end first stage local oscillator frequency must be very close to the frequency of the instrument link's transmit oscillator. This can be achieved by using very stable oscillators in both the instrument link transmission means 30 (FIG. 2) and the remote station receiver means 82. However, the cost size and power consumption consideration for such oscillators, makes their use in an instrument link impractical.

In the present invention, a conventional crystal oscillator is used in the instrument link 2 and the complexity of achieving initial frequency acquisition lies with the remote station receiver means 82. The instrument links 2 transmit a preamble of some number of PN encoded data bits prior to starting the actual reply message. To receive the reply message, the remote station receiver means 82 must detect the presence of the PN-encoded signal and tune its local oscillator to match that of the instrument link within this preamble time.

While no message is being received from the instrument links, the spread spectrum demodulator microprocessor continuously scans the selected channel band to determine if an instrument link is transmitting. This is a coarse scan performed in large steps of about 15 kHz to cover a bandwidth of 150 kHz very rapidly. At each step, the microprocessor waits just long enough (two data bit time) for a complete PN sequence to be received. If no detect pulse is generated the microprocessor steps to the next frequency.

When a detect pulse is generated, the microprocessor performs a coarse tuning by determining the edges of the main lobe where detects are generated. The microprocessor then tunes the NCO to the center of the main lobe and starts using the frequency deviation information between the local oscillator and the received signal from the DPSK demodulator to perform a fine tuning in steps of 250 Hz. The whole process of tuning takes less than 100 bit time, allowing very fast data acquisition.

The spread spectrum demodulator's DPSK modulator provides an indication of the frequency deviation between the local oscillator and the received signal. During a preamble the data sent is set to all ones. In this case the sign of the imaginary part of the complex product indicates whether the local oscillator is at a higher or lower frequency than the received signal. This bit is provided to the microprocessor for initial frequency acquisition as described above.

Figure 5A:
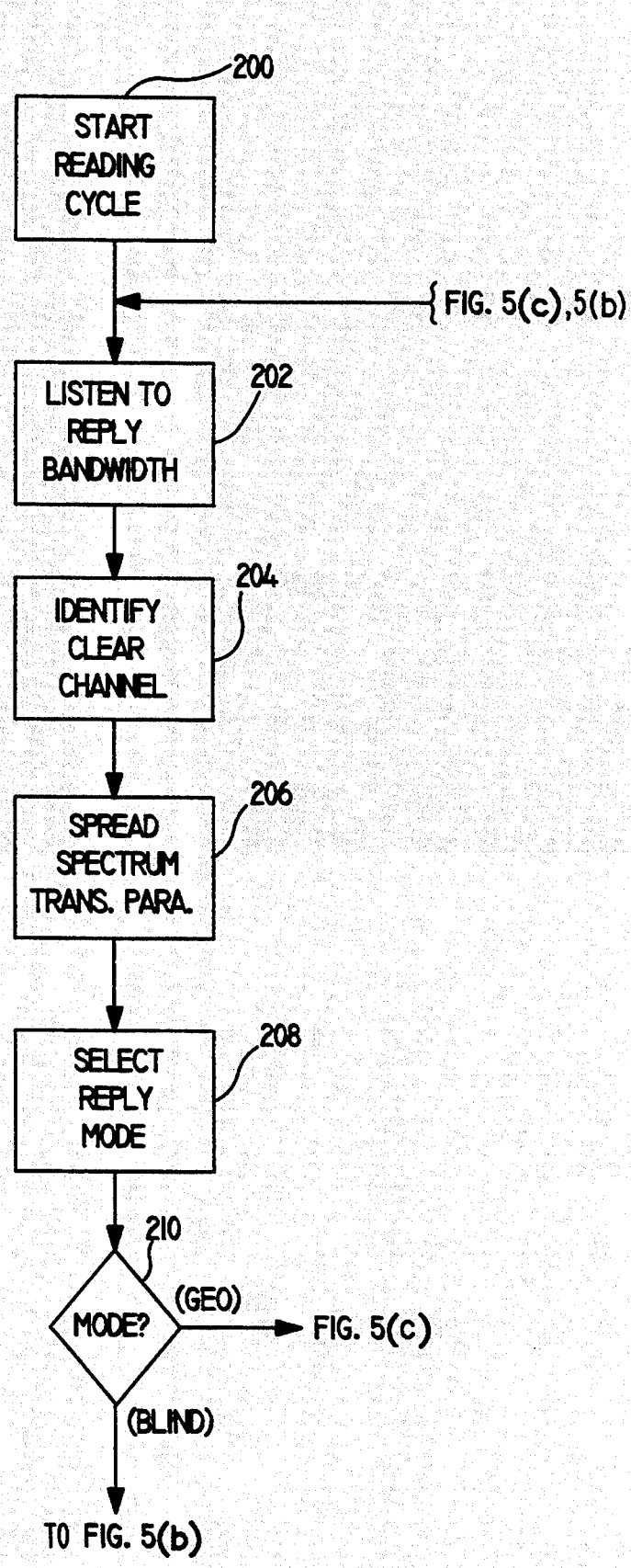
Figure 5B:
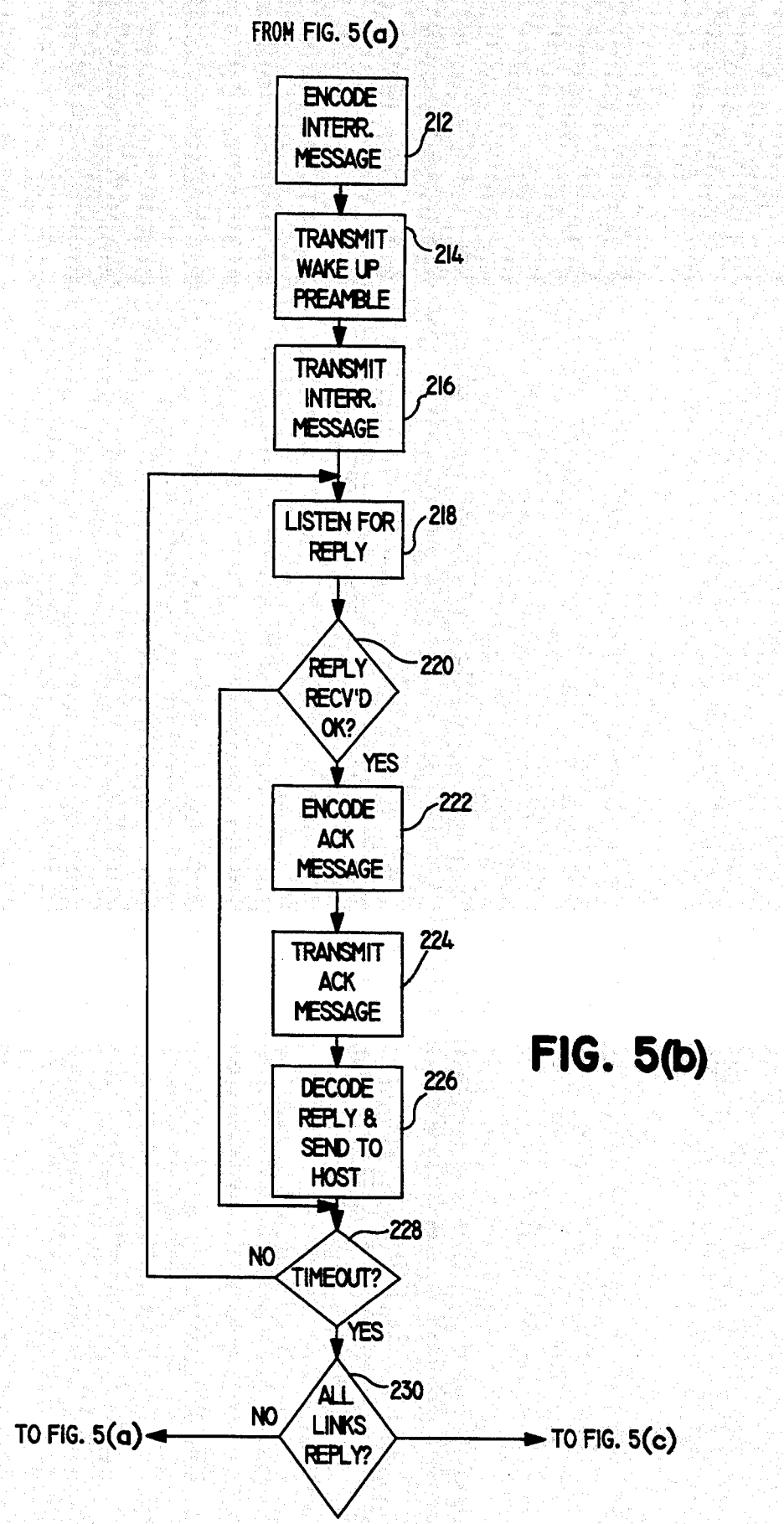

A flow diagram of a remote station's operations/functions in the interrogation mode while using a spread spectrum modulation technique is contained in FIGS. 5a-c. Reference should also be made to FIG. 4 for remote station functional blocks specifically contained in the following discussion. The remote station's acquisition of data from the instrument links 2 (FIG. 1) begins by starting a reading cycle, step 200. Reading cycles are typically differentiated by means of a unique identification number. In the present invention, a reading cycle is also differentiated based on the type of data being acquired (e.g., register readings or diagnostic information).

The remote station receiver means 82 is tuned to listen to each channel in the available reply bandwidth, step 202. Specifically, the receiver means 82 reads the noise level in each reply channel. In an embodiment of the present invention, the reply bandwidth lies in the range of 902-928 MHz. For operations involving spread spectrum modulation, the receiver means 82 also listens for the presence of other signals using the pseudorandom code being used by the instrument links.

An evaluation is made, based on the noise levels in the reply channels, to identify a clear channel in the reply bandwidth, step 204. The identified clear channel is included in the interrogation message sent to the instrument links 2 so an instrument link transmitter is set to transmit at the center frequency for the identified clear channel. This avoids, for example, repeatedly transmitting an instrument link reply message over a plurality of different frequency channels so that at least one reply message sent in one of these channels is received.

After identifying the clear channel, the spread spectrum modulation parameters to be used for transmission of a reply message are determined, step 206. As indicated above, a default code length of 64 chips is specified, however, the processing gain for this code length may not be adequate to ensure that the instrument link's reply message, when transmitted, will be correctly received/transmitted. As such, the remote station 6 also evaluates the noise level of the clear channel and determines the processing gain, and the associated code length (i.e., the number of chips per data bit), needed for the conditions the reply message is expected to be transmitted under.

Before interrogating the instrument links 2, the reply mode (i.e., blind or geographic) of the instrument links is selected, step 208. The mode selected dictates the steps to be taken by the remote station and the instrument link in acquiring and transmitting data or information, step 210.

If the mode selected is the blind mode (BLIND), then the interrogation message is encoded for transmittal to the instrument links 2 within range of the remote station's antenna 84, step 212. The kind of information encoded in the interrogation message includes the transmission mode (i.e., blind), the reading cycle number, the pseudorandom code length, the clear reply channel, and the reply-window length.

A wakeup preamble is transmitted by the remote station 6 to wakeup all the instrument links 2 within range of the remote station's transmissions, step 214. As provided above the instrument link's are normally in the powered down sleep mode to conserve battery power. As such it is necessary to provide a signal to wake up the instrument link so it can evaluate any subsequently transmitted message.

After transmitting the wakeup preamble, the remote station transmits an interrogation message, step 216. In the blind mode, the instrument links transmit a reply message at random times to minimize the potential for collisions of reply messages. As such, after transmitting the interrogation message, the remote station listens for a reply message, step 218.

When a potential reply message is received by the remote station, the message is evaluated by the remote station to determine if it was correctly transmitted, step 220. If a reply message is correctly received (YES), then the remote station encodes an acknowledge message, step 222. The acknowledge message is then transmitted back to the instrument link whose message was correctly received, step 224. An acknowledge message is provided so an instrument link does not reply to a later repeat transmission of the current reading cycle's interrogation message. Each properly received reply message is despread, demodulated, decoded and then sent to the host computer, step 226.

The remote station 6 does not listen for reply messages indefinitely, rather each reading cycle is defined by a prespecified time interval or window. While listening for messages, preparing acknowledgment messages, etc. an evaluation is continuously made to determine whether the time for the prespecified time interval has run out, step 228. If the time has not run out (NO), then the remote station continues to listen for reply messages, step 218.

If time has run out (YES), then an evaluation is made to determine if all the instrument links being interrogated have responded, step 230. If there are instrument links for which a response has not been successfully received (NO), then the current reading cycle is repeated or re-started, step 200. As provided in the discussion concerning FIGS. 3a-f, instrument links 2 that have received a valid acknowledge message will not respond to any subsequent interrogation messages requesting the same information for the current reading cycle. As such, the repeated transmission of another interrogation message only results in transmissions from those instrument links that have not already successfully responded. If all the links to be interrogated have responded, then the current reading cycle is ended, step 232.

If the mode selected is the geographic mode (GEO), an interrogation message is encoded for transmittal to the instrument links 2 within range of the remote station's antenna 84, step 240. The basic difference between the blind and geographic mode interrogation messages is the reply mode specified.

For the geographic mode, like the blind mode, a preamble to wakeup the instrument links is transmitted, step 242, followed by the transmission of the interrogation message, step 244. However, as explained above in the discussion concerning FIGS. 3a–f the instrument links within range of the remote station's transmissions await the receipt of an instrument link select message before an instrument link replies. Accordingly, an instrument link select message is transmitted, step 246, to identify the instrument link that is to respond at that time.

The remote station 6 listens for a reply from the instrument link, step 248 and then evaluates the reply to determine if it was correctly received, step 250. If the reply message was correctly received (YES), then the remote station 6 encodes an acknowledge message, step 252. The acknowledge message is then transmitted back to the instrument link whose message was correctly received, step 254. Each properly received reply message is despread, demodulated, decoded and then sent to the host computer, step 256.

Like the blind mode, the current reading cycle for the geographic mode is defined by a prespecified time interval or window. While listening for instrument link reply messages, preparing acknowledgment messages, etc. an evaluation is continuously made to determine whether the time for the prespecified time interval has run out, step 258. If the time has not run out (NO), then an evaluation is made to determine if the last instrument link has been interrogated, step 260. If the last link has not been interrogated (NO), then the remote station sends out another select instrument link message, step 246 and continues to do so until the last link is interrogated.

If the last link has been interrogated (YES) or if the time for the prespecified time window has run out (YES), then an evaluation is made to determine if all the links have successfully replied, step 262. If all the links have not successfully replied (NO), then another list of instrument links to be interrogated in a specific geographical area is generated, step 264 and the reading cycle is re-started, step 200. If all the instrument links to be interrogated in a geographical area have responded, then the current reading cycle is ended, step 232.

Figure 6:
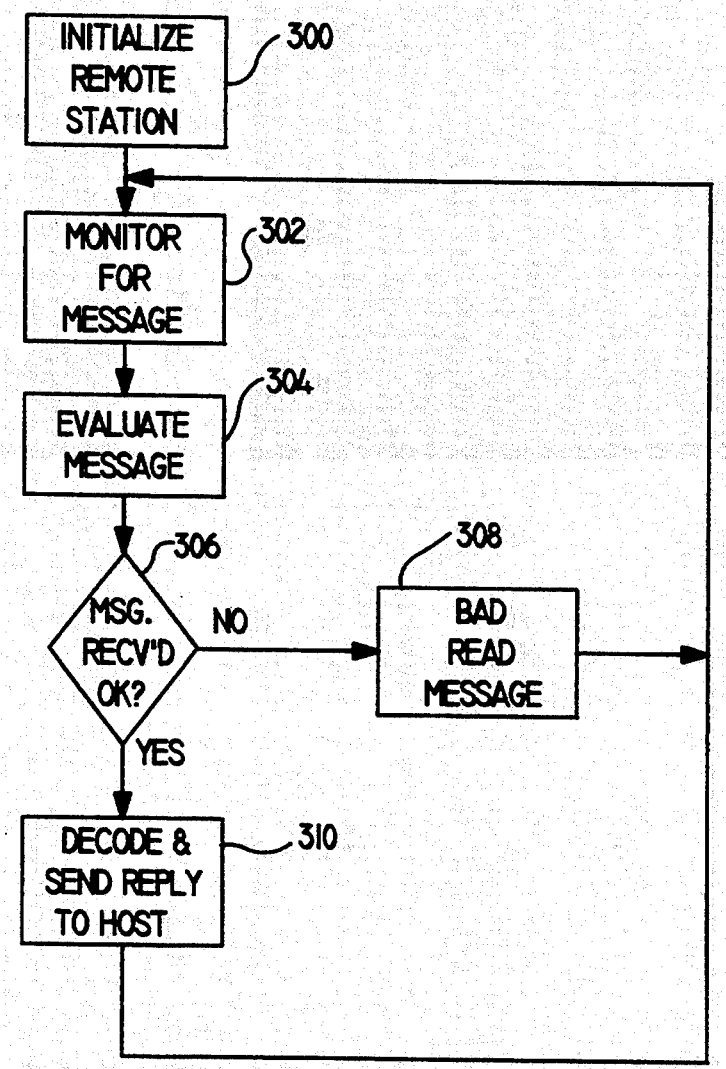
FIG. 6 is a flow diagram of a remote station's operations/functions in the auto-transmit mode.

As discussed in connection with FIGS. 3a–f, in the auto-transmit mode a message is automatically transmitted by the instrument link 2 to the remote station 6. A flow diagram illustrating a remote station's operations during the auto transmit mode is contained in FIG. 6.

In the auto-transmit mode, the remote station 6 is initialized with the required operating parameters, step 300. After initializing, the remote station continuously monitor the channel assigned for these transmissions for an instrument link auto-transmit message, step 302. The message from the instrument link is evaluated to see if it is correctly transmitted and/or received, steps 304, 306. If the message was properly transmitted and/or received (YES), then the transmitted message is decoded and sent to the host computer. If the message was not properly transmitted and/or received (NO), then a bad read message is outputted to the host computer, step 308. After decoding the message or after outputting a bad read message, the remote station returns to monitoring for an instrument link message, step 302.

While a preferred embodiment of the invention has been described using specific terms, such description is for illustrative purposes only, and it is to be understood that changes and variations may be made without departing from the spirit or scope of the following claims.

What is claimed is:

1. A data collection system, comprising an interrogation apparatus and at least one instrument link, interconnected to a data gathering device located remote from said interrogation apparatus, said interrogation apparatus further including:

an interrogation transmitter means for transmitting a radio frequency (RF) signal at a predetermined frequency to said at least one instrument link;

an interrogation receiver means for receiving an informational message from said instrument link, said interrogation receiver means being tunable to any of a number of center frequencies which lie in a prespecified bandpass;

frequency determining means, using said interrogation receiver means, for determining what center frequency, in the prespecified bandpass that an informational message from said instrument link should be transmitted on;

interrogation signal determining means, responsive to said frequency determining means, for determining content of an interrogation message, said message to be transmitted by said interrogation transmitter means, wherein the interrogation message provides at least the center frequency for transmitting the informational message;

tuning means for tuning said interrogation receiver means to the center frequency determined by said frequency determining means so that informational messages from said instrument link can be received; and informational message signal processing means, responsive to said interrogation receiver, for both processing the informational message received and providing an output representative of transmitted information; and wherein each said instrument link further includes:

an instrument link receiver tuned to the predetermined frequency of the interrogation transmitter, said instrument link receiver providing an output representative of a transmitted interrogation message;

interrogation signal processing means, responsive to said instrument link receiver, for processing the receiver output to determine at least what information is to be transmitted by each said instrument link and at what center frequency to transmit the informational message;

instrument link transmission means for transmitting the informational message at the center frequency determined by said interrogation signal processing means, where said instrument link transmission means is tunable to any of the center frequencies that lie in the prespecified bandpass; and informational message generating means, responsive to said interrogation signal processing means, for generating the informational message for transmission by said instrument link transmission means, wherein the informational message generated provides the information requested in the interrogation message.

2. The data collection system of claim 1, wherein said instrument link further includes:
means for selectively controlling the operation of said instrument link receiver, said interrogation signal processing means, said instrument link transmissions means and informational message generating means so that they are powered down except when needed;
wherein said instrument link receiver is turned on periodically for a predetermined interval to listen for an interrogation message preamble; and
wherein said interrogation signal processing means is turned on when an interrogation signal preamble is detected.

3. The data collection system of claim 2, wherein said controlling means turns on said instrument link transmission means and said informational message generating means when said interrogation signal processing means determines that the informational message is to be transmitted.

4. The data collection system of claim 3, wherein said instrument link transmission means further includes a spread spectrum signal transmission means for transmitting spread spectrum radio frequency (RF) signals and wherein said interrogation receiver means further included spread spectrum receiving means for receiving and processing spread spectrum RF signals from said spread spectrum signal transmission means.

5. The data collection system of claim 4, wherein the content of the transmitted interrogation signal includes a transmission mode for said data link communication apparatus, an identifier of at least one instrument link, a reply window length indicating a time interval during which the interrogation apparatus will receive the informational message from said instrument link, a reading cycle number, and a pseudorandom code sequence to modulate the spread spectrum base-band signal being transmitted.

6. The data collection system of claim 4, wherein the content of the transmitted interrogation signal further includes a pseudorandom code sequence to modulate the spread spectrum base-band signal being transmitted, wherein said spread spectrum transmission means of said instrument link is adjustable to transmit a spread spectrum signal using any one of a number of predetermined pseudorandom sequences, and in which said interrogation apparatus further includes:
adjusting and selecting means, responsive to said interrogation receiver, for dynamically adjusting the pseudorandom code sequence from a default code sequence to another predetermined code sequences to increase processing gain and for selecting a pseudorandom code sequence to avoid system interference with extraneous RF spread spectrum signals; and
wherein the pseudorandom code sequence transmitted in the interrogation signal is the pseudorandom code sequence determined by said adjusting and selecting means.

7. The data collection system of claim 6, in which said interrogation apparatus further includes:
informational message evaluation means for evaluating a transmitted informational message from each instrument link to determine if the message was properly received; and
message acknowledging means, responsive to said informational message evaluation means, for generating an acknowledgment message, which message is transmitted by said interrogation transmission means.

8. The data collection system of claim 7, wherein the content of the transmitted interrogation signal further includes a reading cycle number and wherein said interrogation signal processing means further includes means for determining the proper receipt of an acknowledgment message and in which said instrument link includes number storing means, responsive to said interrogation signal processing means, for storing the transmitted cycle number when an acknowledgment message is properly received.

9. The data collection system of claim 8, wherein said interrogation signal processing means further includes reply means for determining if an informational message has already been transmitted and properly received for a given interrogation signal.

10. The data collection system of claim 9, wherein said reply means includes means for comparing the cycle number in said number storage means with the cycle number in the interrogation signal to determine when an informational message has already been transmitted and properly received.

11. The data collection system of claim 9, wherein said means for controlling is responsive to said reply means for determining when to power up and when to power down.

12. The data collection system of claim 9, in which said instrument link further includes antenna means for both receiving and sending RF signals.

13. The data collection system of claim 9, in which said instrument link further includes:
timing means for outputting a signal at preset time intervals;
auto-transmit means, responsive to said timing means, for determining when a given preset time interval has elapsed and outputting a signal when the time has elapsed; and
wherein said Instrument link controlling means is powered up in response to the output signal from said auto-transmit means so an informational message is sent to the interrogation apparatus.

14. The data collection system of claim 9, wherein said interrogation receiver means further includes a surface acoustic wave receiver and means for detecting the presence of an interrogation signal preamble.

15. The data collection system of claim 9, wherein said instrument link transmission means further includes a phase locked loop, a voltage controlled oscillator controlled by said phase locked loop and a modulation means for modulating the RF signal to be transmitted with the pseudorandom code sequence.

16. An instrument link, being interconnected to a data gathering device, the instrument link communicating with a remotely located interrogation apparatus, the instrument link comprising:
an instrument link receiver tuned to a predetermined transmitting frequency for an interrogation transmitter, said instrument link receiver providing an output representative of a transmitted interrogation message, where the transmitted interrogation message provides at least a center frequency for transmitting an informational message;
interrogation signal processing means, responsive to said instrument link receiver, for processing the receiver output to determine at least what information is to be transmitted by the instrument link and at what center frequency to transmit an informational message;

instrument link transmission means for transmitting the informational message at the center frequency determined by said interrogation signal processing means, where said instrument link transmission means is tunable to any of a number of center frequencies that lie in a prespecified bandpass; and informational message generating means for generating an informational message for transmission by said instrument link transmission means, wherein the informational message generated provides the information requested in the interrogation message.

17. The instrument link of claim 16, wherein said instrument link further includes:

means for selectively controlling the operation of said instrument link receiver, said interrogation signal processing means, said instrument link transmissions means and informational message generating means so that they are powered down except when needed;

wherein said instrument link receiver is turned on periodically for a predetermined interval to listen for an interrogation message preamble; and wherein said interrogation signal processing means is turned on when an interrogation signal preamble is detected.

18. The instrument link of claim 17, wherein said controlling means turns on said instrument link transmission means and said informational message generating means when said interrogation signal processing means determines that the informational message is to be transmitted.

19. The instrument link of claim 16, wherein said instrument link transmission means further includes a spread spectrum signal transmission means for transmitting spread spectrum radio frequency (RF) signals.

20. The instrument link of claim 19, wherein the content of a transmitted interrogation signal includes a transmission mode for said data link communication apparatus, an identifier of at least one instrument link, a reply window length indicating the time during which the interrogation apparatus will receive an informational message from said instrument link, a reading cycle number, and a pseudorandom code sequence to modulate the spread spectrum base-band signal being transmitted.

21. The instrument link of claim 19, wherein the interrogation apparatus outputs an acknowledgment message to said instrument link confirming proper receipt of a reply message and in which said instrument link further includes number storing means for storing the transmitted cycle number when an acknowledgment message is received.

22. The instrument link of claim 17, in which said instrument link further includes:

timing means for outputting a signal at preset time intervals;

auto-transmit means, responsive to said timing means, for determining when a given preset time interval has elapsed and outputting a signal when the time has elapsed; and wherein said instrument link controlling means is powered up in response to the output signal from said auto-transmit means so an informational message is sent to the interrogation apparatus.

* * * * *